(12) United States Patent
Zheng et al.

(10) Patent No.: US 12,067,999 B2
(45) Date of Patent: Aug. 20, 2024

(54) AUDIO SIGNAL PROCESSING METHOD AND SYSTEM FOR ECHO SUPPRESSION

(71) Applicant: Shenzhen SHOKZ Co., Ltd., Shenzhen (CN)

(72) Inventors: Jinbo Zheng, Shenzhen (CN); Meilin Zhou, Shenzhen (CN); Fengyun Liao, Shenzhen (CN); Xin Qi, Shenzhen (CN)

(73) Assignee: Shenzhen SHOKZ Co., Ltd., Shenzhen (CN)

( * ) Notice: Subject to any disclaimer, the term of this patent is extended or adjusted under 35 U.S.C. 154(b) by 365 days.

(21) Appl. No.: 17/397,797

(22) Filed: Aug. 9, 2021

(65) Prior Publication Data

US 2022/0208207 A1    Jun. 30, 2022

Related U.S. Application Data

(63) Continuation of application No. PCT/CN2020/140215, filed on Dec. 28, 2020.

(51) Int. Cl.
*G10L 21/0232* (2013.01)
*G10L 21/0208* (2013.01)
*G10L 21/0216* (2013.01)

(52) U.S. Cl.
CPC .............. *G10L 21/0232* (2013.01); *G10L 2021/02082* (2013.01); *G10L 2021/02166* (2013.01)

(58) Field of Classification Search
CPC ....... G10L 21/0232; G10L 2021/02082; G10L 2021/02166; G10L 21/0208; G10L 2021/02165; H04M 9/082; H04R 3/005

(Continued)

(56) References Cited

U.S. PATENT DOCUMENTS

| 7,171,003 B1* | 1/2007 | Venkatesh ............. H04M 9/082 381/86 |
| 10,187,504 B1 | 1/2019 | Ramprashad et al. |
| 2013/0070935 A1* | 3/2013 | Hui ..................... G10L 21/0216 381/71.1 |

FOREIGN PATENT DOCUMENTS

| CN | 106686496 A | 5/2017 |
| CN | 107078403 A | 8/2017 |

(Continued)

OTHER PUBLICATIONS

International Serach Report of PCT/CN2020/140215 (Sep. 28, 2021).

*Primary Examiner* — Carolyn R Edwards
*Assistant Examiner* — Friedrich Fahnert
(74) *Attorney, Agent, or Firm* — FIDELI LAW PLLC

(57) ABSTRACT

In an audio signal processing method and system for echo suppression, selection of a target audio processing mode is controlled based on strength of a speaker signal. In the method and system, a control signal is generated based on the strength of the speaker signal, and the target audio processing mode is controlled based on the control signal to perform signal processing on a microphone signal so as to obtain better voice quality. When the speaker signal does not exceed a threshold, the system selects a first mode, and performs signal processing on a first audio signal and a second audio signal to obtain a first target audio; or when the speaker signal exceeds a threshold, the system selects a second mode, and performs signal processing on a second audio signal to obtain a second target audio, and the mode can be switched based on the speaker signal.

18 Claims, 5 Drawing Sheets

(58) Field of Classification Search
USPC .......................................................... 381/71.1
See application file for complete search history.

(56) References Cited

FOREIGN PATENT DOCUMENTS

| | | | |
|---|---|---|---|
| CN | 107889007 A | 4/2018 | |
| CN | 110110616 A | 8/2019 | |
| EP | 1715669 A1 | 10/2006 | |
| WO | WO-2016137652 A1 * | 9/2016 | ......... G10L 21/0208 |

\* cited by examiner

AUDIO SIGNAL PROCESSING METHOD AND SYSTEM FOR ECHO SUPPRESSION

RELATED APPLICATIONS

This application is a continuation application of PCT application No. PCT/CN2020/140215, filed on Dec. 28, 2020, and the content of which is incorporated herein by reference in its entirety.

TECHNICAL FIELD

This disclosure relates to the audio signal processing field, and in particular, to an audio signal processing method and system for echo suppression.

BACKGROUND

Currently, vibration sensors are applied to electronic products such as headphones, and there are many applications using vibration sensors as bone conduction microphones for receiving voice signals. When a person speaks, bone vibrations and skin vibrations are caused simultaneously. The vibrations are bone conduction voice signals, and can be picked by a bone conduction microphone to generate signals. A system then converts the vibration signals captured by the bone conduction microphone into electrical signals or another type of signals, and transmits the signals to an electronic device for implementing a sound capture function. Currently, in many electronic devices, an air conduction microphone and a bone conduction microphone having different features are combined, where the air conduction microphone is used to pick an external audio signal, the bone conduction microphone is used to pick a vibration signal of a sound generation part, and voice enhancement processing and fusion are then performed on the picked signals. When a bone conduction microphone is placed in an headphone or another electronic device having a speaker, the bone conduction microphone may not only receive a vibration signal when a person speaks, but also receive a vibration signal generated when the headphone, the speaker of the another electronic device plays sound, and therefore generate an echo signal. In such a case, an echo cancellation algorithm may be needed. In addition, voice quality of the microphone is also affected by varying echo signals of the speaker. For example, when the strength of a speaker input signal is high, the strength of a speaker vibration signal received by the bone conduction microphone is also high, and is far higher than that of a vibration signal generated when the person speaks and received by the bone conduction microphone. Thus, the conventional echo cancellation algorithm may hardly cancel an echo of the bone conduction microphone. Hence, the quality of a voice obtained by using microphone signals output by the air conduction microphone and the bone conduction microphone as sound source signals is poor. Therefore, it is undesirable to select a sound source signal of a microphone without considering an echo signal of a speaker.

Therefore, a new audio signal processing method and system for echo suppression is needed to switch input sound source signals based on different speaker input signals, improve an echo cancellation effect, and improve the voice quality.

SUMMARY

This disclosure provides an audio signal processing method and system for echo suppression, so as to improve an echo cancellation effect and improve the voice quality.

According to a first aspect, this disclosure provides an audio signal processing system for echo suppression, including: at least one storage medium storing a set of instructions for audio signal processing for echo suppression; and at least one processor in communication with the at least one storage medium, where during operation, the at least one processor executes the set of instructions to: select, based on a speaker signal, a target audio processing mode of an electronic device from a plurality of audio processing modes, where the speaker signal includes an audio signal sent by a control device to the electronic device; generate a target audio signal by processing a microphone signal in the target audio processing mode to reduce an echo in the target audio signal, where the microphone signal is an output signal of a microphone module obtained by the electronic device, and the microphone module includes at least one first-type microphone and at least one second-type microphone; and output the target audio signal.

According to a second aspect, this disclosure further provides an audio signal processing method for echo suppression, including: selecting, based on a speaker signal, a target audio processing mode of an electronic device from a plurality of audio processing modes, where the speaker signal includes an audio signal sent by a control device to the electronic device; generating a target audio signal by processing a microphone signal in the target audio processing mode to reduce an echo in the target audio signal, where the microphone signal is an output signal of a microphone module obtained by the electronic device, and the microphone module includes at least one first-type microphone and at least one second-type microphone; and outputting the target audio signal.

As can be known from the foregoing technical solutions, in the audio signal processing method and system for echo suppression according to this disclosure, the control signal corresponding to the speaker signal may be generated based on the strength of the speaker signal, and the audio processing mode is controlled or switched based on the control signal, so that signal processing is performed on a sound source signal corresponding to the audio processing mode to obtain better voice quality. When the speaker signal does not exceed the threshold, the system generates the first control signal, selects the first mode, and uses the first audio signal and the second audio signal as a first sound source signal, to perform signal processing on the first sound source signal to obtain the first target audio. However, when the speaker signal exceeds the threshold, a speaker echo in the first audio signal is strong. In this case, the system generates the second control signal, selects the second mode, and uses the second audio signal as a second sound source signal, to perform signal processing on the second sound source signal, to obtain the second target audio. The method and system can switch different audio processing modes based on the speaker signal, and therefore switch the sound source signal of the microphone signal, to improve voice quality and ensure that better voice quality can be obtained in different scenarios.

Other functions of the audio signal processing method and system for echo suppression according to this disclosure are listed in the following descriptions. Based on the descriptions, content described in the following digits and examples is obvious for a person of ordinary skill in the art. Creative aspects of the audio signal processing method and system for echo suppression according to this disclosure may be fully explained by practicing or using the method, device, and a combination thereof in the following detailed examples.

BRIEF DESCRIPTION OF DRAWINGS

To clearly describe the technical solutions in some exemplary embodiments of this disclosure, the following briefly describes the accompanying drawings required for describing these exemplary embodiments. Apparently, the accompanying drawings in the following description show merely some exemplary embodiments of this disclosure, and a person of ordinary skill in the art may derive other drawings from these accompanying drawings without creative efforts.

DETAILED DESCRIPTION

The following description provides specific application scenarios and requirements of this disclosure, in order to enable a person skilled in the art to make or use the contents of this disclosure. For a person skilled in the art, various modifications to the disclosed exemplary embodiments are obvious, and general principles defined herein can be applied to applications without departing from the scope of this disclosure. Therefore, this disclosure is not limited to the illustrated exemplary embodiments, but is to be accorded the widest scope consistent with the claims.

The terms used herein are only intended to describe specific exemplary embodiments and are not restrictive. For example, unless otherwise clearly indicated in a context, the terms "a", "an", and "the" in singular forms may also include plural forms. When used in this disclosure, the terms "comprising", "including", and/or "containing" indicate presence of associated integers, steps, operations, elements, and/or components. However, this does not exclude presence of one or more other features, integers, steps, operations, elements, components, and/or groups thereof or addition of other features, integers, steps, operations, elements, components, and/or groups thereof to the system/method.

In view of the following description, these features and other features of this disclosure, operations and functions of related elements of structures, and combinations of components and economics of manufacturing thereof may be significantly improved. With reference to the drawings, all of these form a part of this disclosure. However, it should be understood that the drawings are only for illustration and description purposes and are not intended to limit the scope of this disclosure. It should also be understood that the drawings are not drawn to scale.

Flowcharts provided in this disclosure show operations implemented by the system according to some exemplary embodiments of this disclosure. It should be understood that operations in the flowcharts may not be implemented sequentially. Conversely, the operations may be implemented in a reverse sequence or simultaneously. In addition, one or more other operations may be added to the flowcharts, and one or more operations may be removed from the flowcharts.

Figure 1:
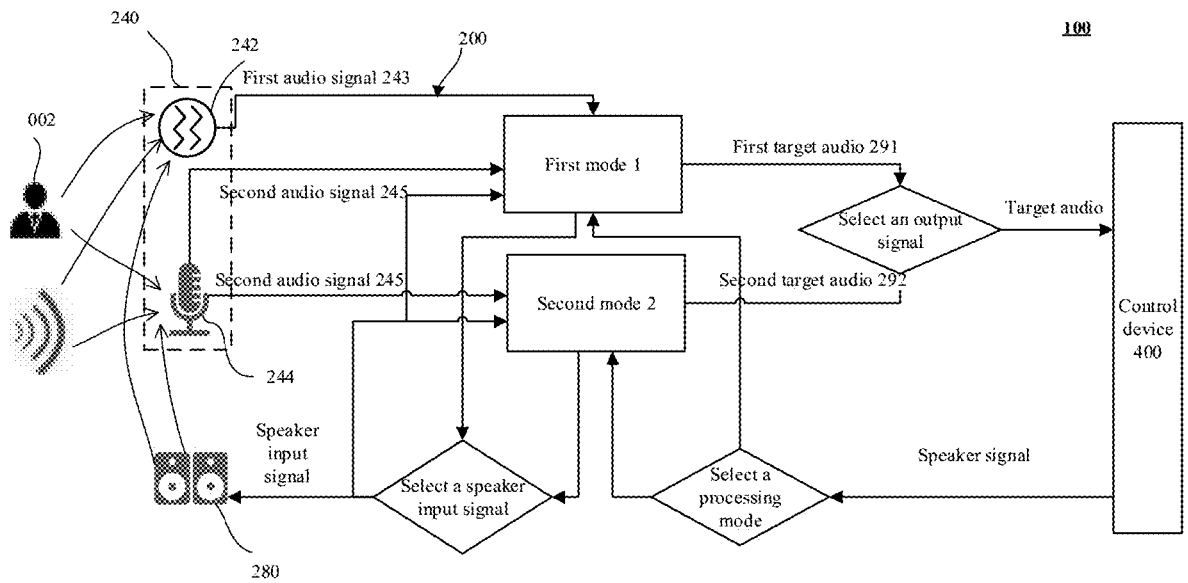
FIG. 1 is a schematic diagram of an application scenario of an audio signal processing system for echo suppression according to some exemplary embodiments of this disclosure.

FIG. 1 is a schematic diagram of an application scenario of an audio signal processing system 100 (hereinafter referred to as the system 100) for echo suppression according to some exemplary embodiments of this disclosure. The system 100 may include an electronic device 200 and a control device 400.

The electronic device 200 may store data or an instruction(s) for performing an audio signal processing method for echo suppression according to this disclosure, and may execute the data and/or the instructions. In some exemplary embodiments, the electronic device 200 may be a wireless headphone, a wired headphone, or an intelligent wearable device, for example, a device having a voice capture function and a voice playing function such as smart glasses, a smart helmet, or a smart watch. The electronic device 200 may also be a mobile device, a tablet computer, a notebook computer, a built-in device of a motor vehicle, or the like, or any combination thereof. In some exemplary embodiments, the mobile device may include a smart household device, a smart mobile device, or the like, or any combination thereof. For example, the smart mobile device may include a mobile phone, a personal digital assistant, a game device, a navigation device, an ultra-mobile personal computer (UMPC), or the like, or any combination thereof. In some exemplary embodiments, the smart household device may include a smart TV, a desktop computer, or the like, or any combination thereof. In some exemplary embodiments, the built-in device of a motor vehicle may include an on-board computer, an on-board television, or the like.

The control device 400 may be a remote device that performs wired and/or wireless audio signal communication with the electronic device 200. The control device 400 may also be a local device in communication with the electronic device 200. The electronic device 200 may capture a local audio signal and output the local audio signal to the control device 400. The electronic device 200 may further receive a far-end audio signal sent by the control device 400 and then output the far-end audio signal. The far-end audio signal may also be referred to as a speaker signal. The control device 400 may also be a device having a voice capture function and a voice playing function, for example, a mobile phone, a tablet computer, a notebook computer, a headphone, an intelligent wearable device, a built-in device of a motor vehicle, or the like, or any combination thereof. For example, when the electronic device 200 is a headphone, the control device 400 may be a terminal device in communication with the headphone, for example, a mobile phone or a computer.

As shown in FIG. 1, the electronic device 200 may include a microphone module 240 and a speaker 280. The microphone module 240 may be configured to obtain a local audio signal, and output a microphone signal, that is, an electrical signal carrying audio information. The microphone module 240 may be an out-of-ear microphone module or may be an in-ear microphone module. For example, the microphone module 240 may be a microphone disposed out of the auditory canal, or may be a microphone disposed in the auditory canal. The microphone module 240 may include at least one first-type microphone 242 and at least one second-type microphone 244. The first-type microphone 242 may be different from the second-type microphone 244. The first-type microphone 242 may be a microphone directly capturing a human body vibration signal, for example, a bone conduction microphone. The second-type microphone 244 may be a microphone directly capturing an air vibration signal, for example, an air conduction microphone. Certainly, the first-type microphone 242 and the second-type microphone 244 may also be microphones of other types. For example, the first-type microphone 242 may be an optical microphone; and the second-type microphone 244 may be a microphone receiving an electromyographic signal. Since the first-type microphone 242 is different from the second-type microphone 244, and is different therefrom in sensing an audio signal, thus noise components and echo components in corresponding audio signals may also be different. For ease of description, in the following descriptions, the bone conduction microphone is used as an example of the first-type microphone 242, and the air conduction microphone is used as an example of the second-type microphone 244.

The bone conduction microphone may include a vibration sensor, for example, an optical vibration sensor or an acceleration sensor. The vibration sensor may capture a mechanical vibration signal (for example, a signal generated by a vibration generated by the skin or bones when a user 002 speaks), and convert the mechanical vibration signal into an electrical signal. Herein, the mechanical vibration signal mainly refers to a vibration propagated by a solid. The bone conduction microphone may capture, by touching the skin or bones of the user 002 with the vibration sensor or a vibration component connected to the vibration sensor, a vibration signal generated by the bones or skin when the user 002 generates sound, and convert the vibration signal into an electrical signal. In some exemplary embodiments, the vibration sensor may be a device that is sensitive to a mechanical vibration but insensitive to an air vibration (that is, a capability of responding to the mechanical vibration by the vibration sensor exceeds a capability of responding to the air vibration by the vibration sensor). Because the bone conduction microphone may directly capture a vibration signal of a sound generation part, the bone conduction microphone can reduce impact of ambient noise.

The air conduction microphone captures an air vibration signal caused when the user 002 generates sound, and converts the air vibration signal into an electrical signal. The air conduction microphone may be a separate air conduction microphone, or may be a microphone array including two or more air conduction microphones. The microphone array may be a beamforming microphone array or another microphone array. Sound coming from different directions or positions may be captured by using the microphone array.

The first-type microphone 242 may output a first audio signal 243. The second-type microphone 244 may output a second audio signal 245. The microphone signal includes the first audio signal 243 and the second audio signal 245. In a scenario of low ambient noise, the second audio signal 245 has better voice quality than the first audio signal 243. However, in a scenario of high ambient noise, voice quality of the first audio signal 243 is higher in a low-frequency portion, but voice quality of the second audio signal 245 is higher in a high-frequency portion. Therefore, in the scenario of high ambient noise, an audio signal obtained by performing feature fusion on the first audio signal 243 and the second audio signal 245 has good voice quality. In an actual use process, ambient noise may change all the time, and changes between the scenario of low noise and the scenario of high noise occurs repeatedly.

The speaker 280 may convert an electrical signal into an audio signal. The speaker 280 may be configured to receive the speaker signal from the control device 400, and output a signal. For ease of description, an audio signal input to the speaker 280 is defined as a speaker input signal. In some exemplary embodiments, the speaker input signal may be the speaker signal. In some exemplary embodiments, the electronic device 200 may perform signal processing on the speaker signal, and send an audio signal obtained after the signal processing to the speaker 280 for outputting. In this case, the speaker input signal may be an audio signal obtained after the electronic device 200 performs signal processing on the speaker signal.

Sound of the speaker input signal may be, after being output by the speaker 280, sent to the user 002 in a manner of air conduction or bone conduction. The speaker 280 may be a speaker that transmits sound by transmitting a vibration signal to a human body, for example, a bone conduction speaker, or may be a speaker that transmits a vibration signal through air, for example, an air conduction speaker. The bone conduction speaker may generate a mechanical vibration by using a vibration module, and sends the mechanical vibration to the ear through bones. For example, the speaker 280 may touch the head of the user 002 directly or using a specific medium (for example, one or more panels), and send the audio signal to an auditory nerve of the user in a manner of a skull vibration. The air conduction speaker may generate an air vibration by using a vibration module, and conducts the air vibration to the ear through air. Alternatively, the speaker 280 may be a combination of a bone conduction speaker and an air conduction speaker. The speaker 280 may also be a speaker of another type. The sound of the speaker input signal, after being output by the speaker 280, may be captured by the microphone module 240, and form an echo. The higher the strength of the speaker input signal, the higher the strength of sound output by the speaker 280, and the higher the strength of the echo signal is higher.

It should be noted that the microphone module 240 and the speaker 280 may be integrated in the electronic device 200, or may be devices externally connected to the electronic device 200.

The first-type microphone 242 and the second-type microphone 244 during working may not only capture sound generated by the user 002, but also capture ambient noise and the sound generated by the speaker 280. The electronic device 200 may capture an audio signal by using the microphone module 240 and generate the microphone signal. The microphone signal may include the first audio signal 243 and the second audio signal 245. In different scenarios, voice quality of the first audio signal 243 is different from voice quality of the second audio signal 245. To ensure voice communication quality, the electronic device 200 may select a target audio processing mode from a plurality of audio processing modes based on different application scenarios to select an audio signal with better voice quality from the microphone signal as a sound source signal, and then perform signal processing on the sound source signal in the target audio processing mode and then output the signal to the control device 400. The sound source signal may be an input signal in the target audio processing mode. In some exemplary embodiments, the signal processing may include noise suppression to reduce a noise signal(s). In some exemplary embodiments, the signal processing may include echo suppression to reduce an echo signal(s). In some exemplary embodiments, the signal processing may include not only the noise suppression but also the echo suppression. In some exemplary embodiments, the signal processing may also be directly outputting the sound source signal. For ease of description, the signal processing includes the echo suppression. A person skilled in the art would understand that all other signal processing modes fall within the scope of this disclosure.

The selection of the target audio processing mode by the electronic device 200 is related to the speaker signal in addition to ambient noise. In some scenarios, for example, when the speaker signal is low and the sound output by the speaker 280 is also low, voice quality of the audio signal that is obtained by performing feature fusion on the first audio signal 243 output by the first-type microphone 242 and the second audio signal 245 output by the second-type microphone 244 is higher than voice quality of the second audio signal 245 output by the second-type microphone 244.

However, in some special scenarios, for example, when the speaker signal is high, and the sound output by the speaker 280 is also high, they have great impact on the first audio signal 243 output by the first-type microphone 242, such that a high echo may be caused in the first audio signal 243. In some exemplary embodiments, an echo signal in the first audio signal 243 is higher than a voice signal of the user 002. Especially when the speaker 280 is a bone conduction speaker, the echo signal in the first audio signal 243 is more significant. A conventional echo cancellation algorithm may hardly cancel the echo signal in the first audio signal 243, thus may not ensure an echo cancellation effect. In such a case, voice quality of the second audio signal 245 output by the second-type microphone 244 may be better than voice quality of the audio signal that is obtained by performing feature fusion on the first audio signal 243 output by the first-type microphone 242 and the second audio signal 245 output by the second-type microphone 244.

Therefore, the electronic device 200 may select the target audio processing mode from the plurality of audio processing modes based on the speaker signal to perform the signal processing on the microphone signal. The plurality of audio processing modes may include at least a first mode 1 and a second mode 2.

In the first mode 1, signal processing may be performed on the first audio signal 243 and the second audio signal 245. As described above, in some exemplary embodiments, the signal processing may include noise suppression to reduce a noise signal. In some exemplary embodiments, the signal processing may include echo suppression to reduce an echo signal. In some exemplary embodiments, the signal processing may include not only the noise suppression but also the echo suppression. For ease of description, the signal processing includes the echo suppression. A person skilled in the art would understand that all other signal processing modes fall within the scope of this disclosure.

In the second mode 2, signal processing may be performed on the second audio signal 245. In some exemplary embodiments, the signal processing may include noise suppression to reduce a noise signal. In some exemplary embodiments, the signal processing may include echo suppression to reduce an echo signal. In some exemplary embodiments, the signal processing may include not only the noise suppression but also the echo suppression. For ease of description, the signal processing includes the echo suppression. A person skilled in the art should understand that all other signal processing modes fall within the scope of this disclosure.

The target audio processing mode may be one of the first mode 1 and the second mode 2. The plurality of audio processing modes may further include other modes, for example, a processing mode of performing signal processing on the first audio signal 243.

Therefore, when the speaker signal is low, to ensure that a voice for voice communication has a high quality, the electronic device 200 may select the first mode 1, uses the first audio signal 243 and the second audio signal 245 as sound source signals, and performs signal processing on the sound source signals to generate and output a first target audio 291 for voice communication. When the speaker signal is high, to ensure that a voice for voice communication has a high quality, the electronic device 200 may select the second mode 2, uses the second audio signal 245 as a sound source signal, and performs signal processing on the sound source signal to generate and output a second target audio 292 for voice communication.

The electronic device 200 may execute based on the data or the instruction for performing the audio signal processing method for echo suppression that is described in this disclosure, and obtain the microphone signal and the speaker signal; and the electronic device 200 may select, based on signal strength of the speaker signal, a corresponding target audio processing mode to perform signal processing on the microphone signal. Specifically, the electronic device 200 may select, based on the strength of the speaker signal, the target audio processing mode corresponding to the strength of the speaker signal from the plurality of audio processing modes, select, from the first audio signal 243 and the second audio signal 245, an audio signal with better voice quality or a combination thereof as a sound source signal, use a corresponding signal processing algorithm to perform signal processing (for example, echo cancellation and noise reduction processing) on the sound source signal, and generate a target audio for outputting, so as to reduce an echo in the target audio. The target audio may include one of the first target audio 291 and the second target audio 292. The electronic device 200 may output the target audio to the control device 400.

As described above, to ensure voice quality of communication, the electronic device 200 may control and select the target audio processing mode based on the strength of the speaker signal so as to select an audio signal with better voice quality as a sound source signal of the electronic device 200, and perform signal processing on the sound source signal to obtain different target audios for different use scenarios. Therefore, best voice quality of the target audio may be ensured in different use scenarios.

Figure 2:
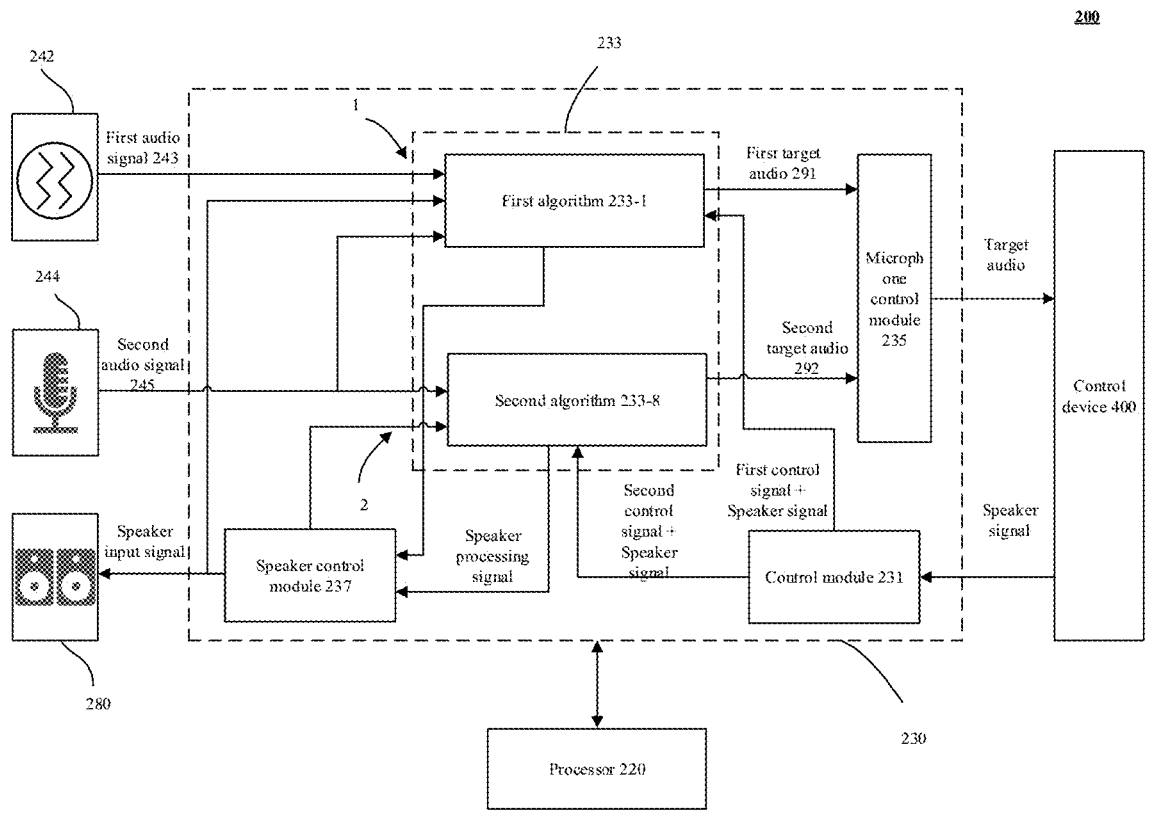
FIG. 2 is a schematic device diagram of an electronic device according to some exemplary embodiments of this disclosure.

FIG. 2 is a schematic device diagram of an electronic device 200. The electronic device 200 may perform an audio signal processing method for echo suppression that is described in this disclosure. The audio signal processing method for echo suppression is described in other parts of this disclosure. For example, the audio signal processing method for echo suppression is described in the descriptions of FIG. 5 to FIG. 7.

As shown in FIG. 2, the electronic device 200 may include a microphone module 240 and a speaker 280. In some exemplary embodiments, the electronic device 200 may further include at least one storage medium 230 and at least one processor 220.

The storage medium 230 may include a data storage device. The data storage device may be a non-transitory storage medium, or may be a transitory storage medium. For example, the data storage device may include one or more of a magnetic disk, a read-only memory (ROM), or a random access memory (RAM). The storage medium 230 may further include at least one instruction set stored in the data storage device, where the instruction set may be used for audio signal processing for echo suppression. The instruction set may be computer program code, where the computer program code may include a program, a routine, an object, a component, a data structure, a process, a module, or the like for performing the audio signal processing method for echo suppression provided in this disclosure.

As shown in FIG. 2, the at least one instruction set may include a control instruction, which may be sent by a control module 231 and configured to generate, based on the speaker signal or the speaker signal and the microphone signal, a control signal corresponding to the speaker signal. The control signal may include a first control signal or a second control signal. The first control signal corresponds to a first mode 1. The second control signal corresponds to a second mode 2. The control signal may be any signal. For example, the first control signal may be a signal 1, and the second control signal may be a signal 2. The control instruction sent by the control module 231 may generate a corresponding control signal based on signal strength of the speaker signal or signal strength of the speaker signal and an evaluation parameter of the microphone signal. A correspondence between the control signal and the speaker signal or the speaker signal and the microphone signal will be described in detail in subsequent descriptions. The control module 231 may further select, based on the control signal, a target audio processing mode corresponding to the control signal. When the control signal is the first control signal, the control module 231 may select the first mode 1. When the control signal is the second control signal, the control module 231 may select the second mode 2.

In some exemplary embodiments, the at least one instruction set may further include an echo processing instruction, which may be sent by an echo processing module 233 and configured to perform signal processing (for example, echo suppression, and noise reduction processing) on the microphone signal based on the control signal by using the target audio processing mode of the electronic device 200. When the control signal is the first control signal, the echo processing module 233 may use the first mode 1 to perform signal processing on the microphone signal. When the control signal is the second control signal, the echo processing module 233 may use the second mode 2 to perform signal processing on the microphone signal.

The echo processing module 233 may include a first algorithm 233-1 and a second algorithm 233-8. The first algorithm 233-1 may correspond to the first control signal and the first mode 1. The second algorithm 233-8 may correspond to the second control signal and the second mode 2.

In the first mode 1, the electronic device 200 may use the first algorithm 233-1 to perform signal processing on a first audio signal 243 and a second audio signal 245 respectively, perform feature fusion on the first audio signal 243 and the second audio signal 245 after the signal processing, and outputs a first target audio 291.

Figure 3:
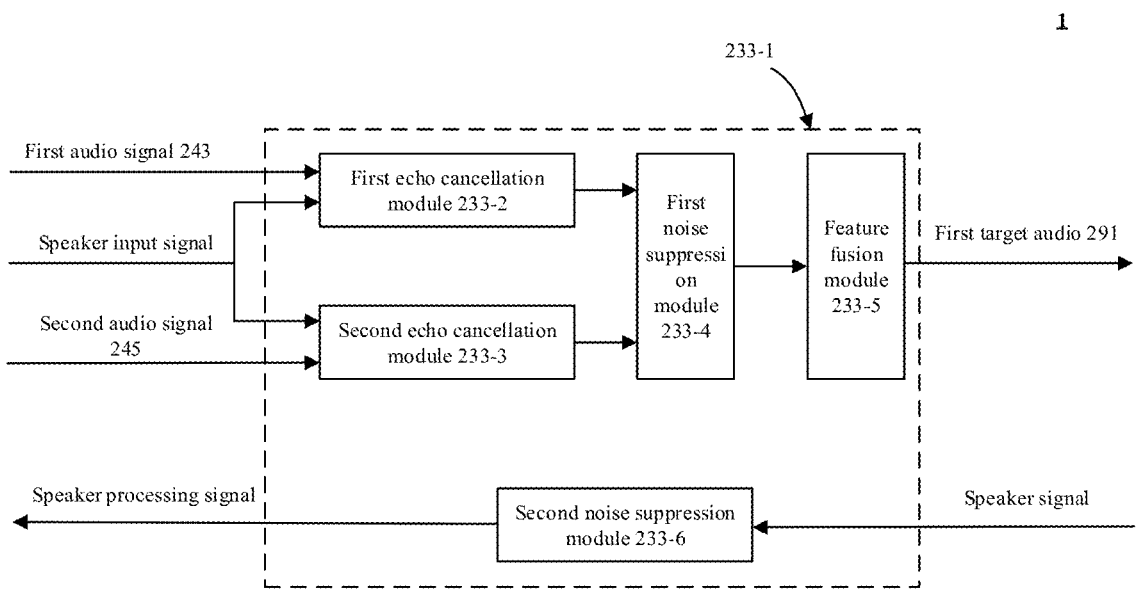
FIG. 3 is a schematic working diagram of a first mode according to some exemplary embodiments of this disclosure.

FIG. 3 is a schematic working diagram of the first mode 1 according to some exemplary embodiments of this disclosure. As shown in FIG. 3, in the first mode 1, the first algorithm 233-1 may receive the first audio signal 243, the second audio signal 245, and the speaker input signal. The first algorithm 233-1 may use a first echo cancellation module 233-2 to perform echo cancellation on the first audio signal 243 based on the speaker input signal. The speaker input signal may be an audio signal after noise reduction processing. The first echo cancellation module 233-2 may receive the first audio signal 243 and the speaker input signal, and output the first audio signal 243 after echo cancellation. The first echo cancellation module 233-2 may be a single-microphone echo cancellation algorithm.

In some exemplary embodiments, the first algorithm 233-1 may use a second echo cancellation module 233-3 to perform echo cancellation on the second audio signal 245 based on the speaker input signal. The second echo cancellation module 233-3 may receive the second audio signal 245 and the speaker input signal, and output the second audio signal 245 after echo cancellation. The second echo cancellation module 233-3 may be a single-microphone echo cancellation algorithm, or may be a multi-microphone echo cancellation algorithm. The first echo cancellation module 233-2 and the second echo cancellation module 233-3 may be the same or may be different.

In some exemplary embodiments, the first algorithm 233-1 may use a first noise suppression module 233-4 to perform noise suppression on the first audio signal 243 and the second audio signal 245 after echo cancellation. The first noise suppression module 233-4 may be configured to suppress noise signals in the first audio signal 243 and the second audio signal 245. The first noise suppression module may 233-4 receive the first audio signal 243 and the second audio signal 245 after echo cancellation, and output the first audio signal 243 and the second audio signal 245 after noise suppression. The first noise suppression module 233-4 may perform noise reduction on the first audio signal 243 and the second audio signal 245 separately, or may perform noise reduction on the first audio signal 243 and the second audio signal 245 simultaneously.

In some exemplary embodiments, the first algorithm 233-1 may use a feature fusion module 233-5 to perform feature fusion processing on the first audio signal 243 and the second audio signal 245 after noise suppression. The feature fusion module 233-5 may receive the first audio signal 243 and the second audio signal 245 after noise reduction processing. The feature fusion module 233-5 may analyze voice quality of the first audio signal 243 and the second audio signal 245. For example, the feature fusion module 233-5 may analyze valid voice signal strength, noise signal strength, echo signal strength, a signal-to-noise ratio, and the like of the first audio signal 243 and the second audio signal 245, determine voice quality of the first audio signal 243 and the second audio signal 245, and fuse the first audio signal 243 and the second audio signal 245 into the first target audio 291 accordingly for outputting.

In some exemplary embodiments, the first algorithm 233-1 may further use a second noise suppression module 233-6 to perform noise suppression on the speaker signal. The second noise suppression module 233-6 may be configured to suppress a noise signal in the speaker signal. The second noise suppression module may 233-6 receive the speaker signal sent by a control device 400, cancel noise signals such as far-end noise and channel noise in the speaker signal, and electronic noise in the electronic device 200, and output a processed speaker signal after the above noise reduction.

It should be noted that FIG. 3 is only an example for description. A person skilled in the art would understand that in some exemplary embodiments, the first algorithm 233-1 may include the feature fusion module 233-5. In some exemplary embodiments, the first algorithm 233-2 may further include any one or any combination of the first echo cancellation module 233-2, the second echo cancellation module 233-3, the first noise suppression module 233-4, and the second noise suppression module 233-6.

In the second mode 2, the electronic device 200 may use the second algorithm 233-8 to perform signal processing on the second audio signal 245, and outputs a second target audio 292.

Figure 4:
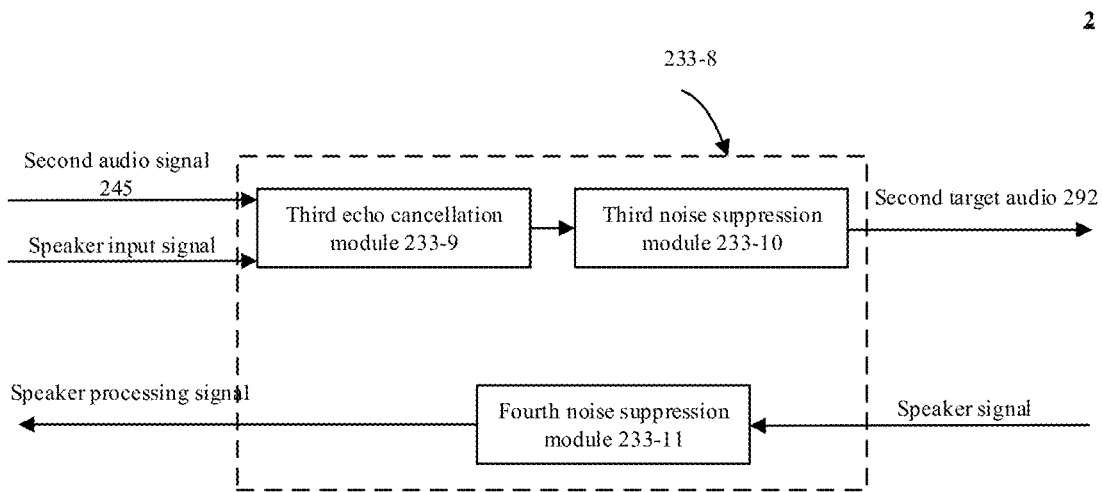
FIG. 4 is a schematic working diagram of a second mode according to some exemplary embodiments of this disclosure.

FIG. 4 is a schematic working diagram of the second mode 2 according to some exemplary embodiments of this disclosure. As shown in FIG. 4, in the second mode 2, the second algorithm 233-8 may receive the second audio signal 245 and the speaker input signal. The second algorithm 233-8 may use a third echo cancellation module 233-9 to perform echo cancellation on the second audio signal 245 based on the speaker input signal. The third echo cancellation module 233-9 may receive the second audio signal 245 and the speaker input signal, and output the second audio signal 245 after echo cancellation. The third echo cancellation module 233-9 and the second echo cancellation module 233-3 may be the same or may be different.

In some exemplary embodiments, the second algorithm 233-8 may use a third noise suppression module 233-10 to perform noise suppression on the second audio signal 245 after echo cancellation. The third noise suppression module 233-10 may be configured to suppress a noise signal in the second audio signal 245. The third noise suppression module 233-10 may receive the second audio signal 245 after echo cancellation, and output the second audio signal 245 after noise suppression as the second target audio 292. The third noise suppression module 233-10 and the first noise suppression module 233-4 may be the same or may be different.

In some exemplary embodiments, the second algorithm 233-8 may further use a fourth noise suppression module 233-11 to perform noise suppression on the speaker signal. The fourth noise suppression module 233-11 may be configured to suppress the noise signal in the speaker signal. The fourth noise suppression module 233-11 may receive the speaker signal sent by the control device 400, cancel noise signals such as far-end noise and channel noise in the speaker signal, and electronic noise in the electronic device 200, and output a speaker processing signal after the above noise reduction. The fourth noise suppression module 233-11 and the second noise suppression module 233-6 may be the same or may be different.

It should be noted that FIG. 4 is only an example for description. A person skilled in the art should understand that in some exemplary embodiments, the second algorithm 233-8 may include any one or any combination of the third echo cancellation module 233-9, the third noise suppression module 233-10, and the fourth noise suppression module 233-11. In some exemplary embodiments, the second algorithm 233-8 may not include any one of the foregoing signal processing modules either, but directly outputs the second audio signal 245.

Only one of the first mode 1 and the second mode 2 may operate in order to save computing resources. When the first mode 1 runs, the second mode 2 may be disabled. When the second mode 2 operates, the first mode 1 may be disabled. The first mode 1 and the second mode 2 may also operate simultaneously. When one of the two modes operates, an algorithm parameter of the other mode may be updated. When the electronic device 200 switches between the first mode 1 and the second mode 2, some parameters in the first mode 1 and the second mode 2 may be shared (for example, a noise parameter obtained by a noise evaluation algorithm, a human voice parameter obtained by a human voice estimation algorithm, and a signal-to-noise ratio parameter obtained by a signal-to-noise ratio algorithm). Therefore, computing resources may be saved, and a calculation result may be more accurate. Alternatively, the first algorithm 233-1 and the second algorithm 233-8 in the first mode and the second mode may be shared with some parameters in the control instruction sent by the control module 231, for example, a noise parameter obtained by the noise estimation algorithm, a human voice parameter obtained by the human voice estimation algorithm, and a signal-to-noise ratio parameter obtained by the signal-to-noise ratio algorithm. Therefore, the computing resources may be saved, and the calculation result may be more accurate.

In some exemplary embodiments, the at least one instruction set may further include a microphone control instruction, which may be executed by a microphone control module 235 and configured to perform smoothing processing on the target audio, and output the target audio after smoothing processing to the control device 400. The microphone control module 235 may receive a control signal generated by the control module 231, and the target audio, and perform the smoothing processing on the target audio based on the control signal. When the control signal is the first control signal, the first mode 1 operates, and the first target audio 291 output by the first algorithm 233-1 may be used as an input signal. When the control signal is the second control signal, the second mode 2 operates, and the second target audio 292 output by the second algorithm 233-8 may be used as an input signal. When the control signal switches between the first control signal and the second control signal, resulting in switching of the target audio processing mode between the first mode 1 and the second mode 2; in such a case, in order to avoid signal discontinuity caused by switching between the first target audio 291 and the second target audio 292, the microphone control module 235 may perform smoothing processing on the target audio. Specifically, the microphone control module 235 may adjust the first target audio 291 and a parameter of the first target audio 291, so that the target audio is continuous. The parameter may be pre-stored in the at least one storage medium 230. The parameter may be an amplitude, a phase, a frequency response, or the like. The adjustment may include an volume adjustment of the target audio, an EQ (equalize) adjustment, an residual noise adjustment, or the like. The microphone control module 235 may allow the target audio to be a continuous signal when the target audio processing mode switches between the first mode 1 and the second mode 2, so that a user 002 hardly perceives the switching between these two modes.

In some exemplary embodiments, the at least one instruction set may further include a speaker control instruction, which may be executed by a speaker control module 237 and configured to adjust the processed speaker signal to obtain the speaker input signal, and output the speaker input signal to the speaker 280 for outputting sound. The speaker control module 237 may receive the processed speaker signals output by the first algorithm 233-1, the second algorithm 233-8 and the control signal. When the control signal is the first control signal, the speaker control module 237 may control the processed speaker signal output by the first algorithm 233-1, so that the processed speaker signal may be reduced or disabled, and then output to the speaker 280 for outputting, so as to reduce sound output by the speaker 280 and improve an echo cancellation effect of the first algorithm 233-1. When the control signal is the second control signal, the speaker control module 237 may not adjust the processed speaker signal output by the second algorithm 233-8. When the control signal switches between the first control signal and the second control signal, to avoid discontinuity of the sound output by the speaker 280, the speaker control module 237 may perform smoothing processing on the processed speaker signals output by the first algorithm 233-1 and the second algorithm 233-8. When switching is performed between the first control signal and the second control signal, the speaker control module 237 ensures signal continuity as much as possible, so that the user 002 hardly perceives switching between the two control signals.

In the first mode 1, the first algorithm 233-1 may set a high priority on a voice of the user 002 that is picked by the near-end microphone module 240. When the processed speaker signal is excessively high, the speaker control module 237 may process the processed speaker signal to reduce the speaker input signal, so as to reduce sound output by the speaker 280, and reduce an echo to ensure near-end voice quality. The second algorithm 233-8 may set a high priority on the speaker input signal of the speaker 280, and does not use the first audio signal 243 output by a first-type microphone 242 so as to ensure voice quality and voice intelligibility of the speaker input signal of the speaker 280.

The at least one processor 220 may be in communication with the at least one storage medium 230, the microphone module 240, and the speaker 280. The communication may be in any form and capable of directly or indirectly receiving information. The at least one processor 220 may be configured to execute the at least one instruction set. When a system 100 operates, the at least one processor 220 reads the at least one instruction set, obtains data of the microphone module 240 and the speaker 280 based on an instruction of the at least one instruction set, and performs the audio signal processing method for echo suppression that is provided by this disclosure. The processor 220 may perform all steps included in the audio signal processing method for echo suppression. The processor 220 may be in a form of one or more processors. In some exemplary embodiments, the processor 220 may include one or more hardware processors, for example, a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any other circuit or processor that can implement one or more functions, and the like, or any combination thereof. For ease of description, only one processor 220 is in the electronic device 200 herein. However, it should be noted that the electronic device 200 in this disclosure may further include a plurality of processors. Therefore, operations and/or method steps disclosed in this disclosure may be performed by one processor in this disclosure, or may be performed jointly by a plurality of processors. For example, if the processor 220 of the electronic device 200 in this disclosure performs step A and step B, it should be understood that step A and step B may be performed jointly or separately by two different processors 220 (for example, the first processor performs step A, and the second processor performs step B, or the first processor and the second processor jointly perform step A and step B).

In some exemplary embodiments, the system 100 may select the target audio processing mode of the electronic device 200 based on the signal strength of the speaker signal. In some exemplary embodiments, the system 100 may select the target audio processing mode of the electronic device 200 based on the signal strength of the speaker signal and the microphone signal.

Figure 5:
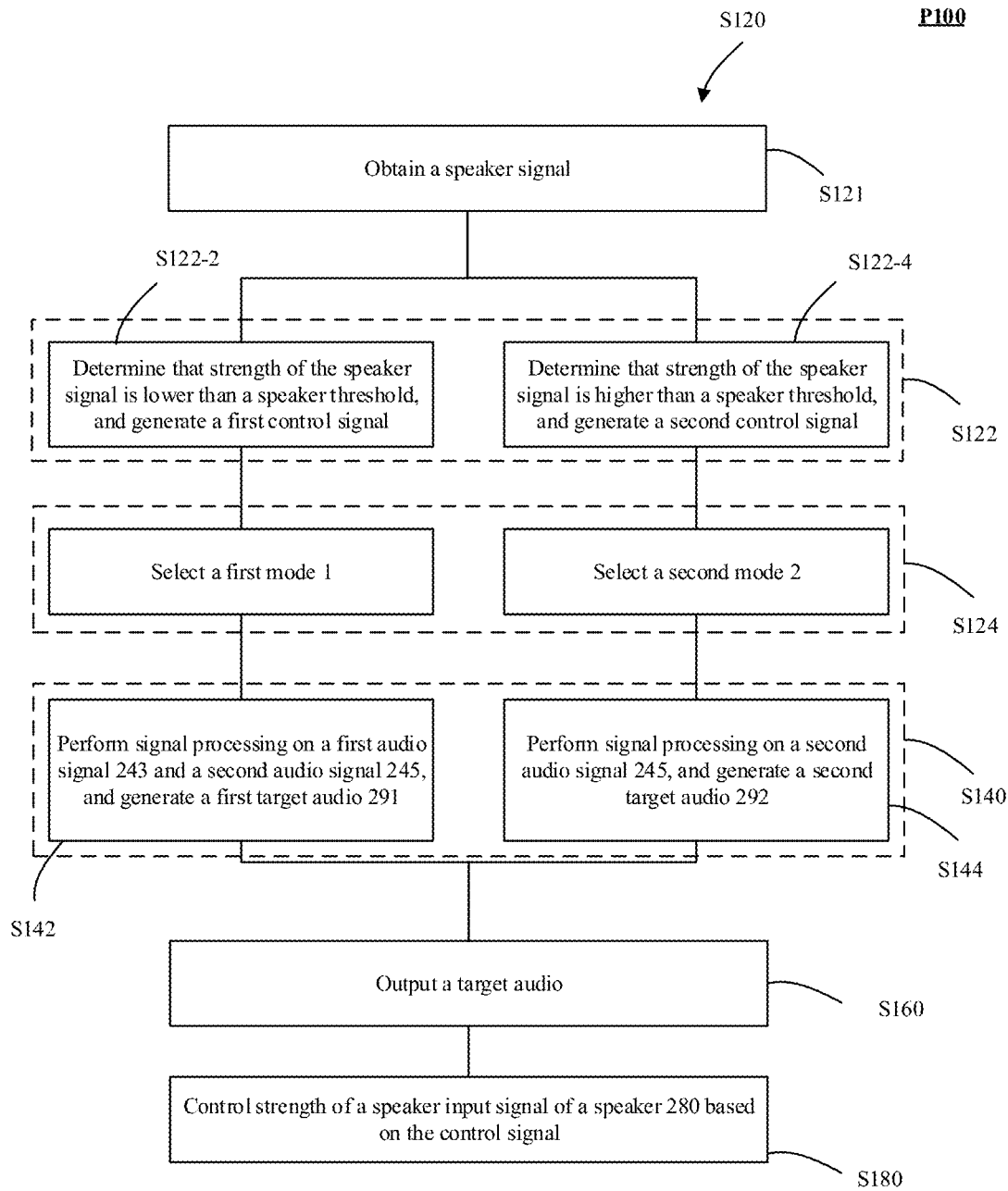
FIG. 5 is a flowchart of an audio signal processing method for echo suppression according to some exemplary embodiments of this disclosure.

FIG. 5 is a flowchart of an audio signal processing method P100 for echo suppression according to some exemplary embodiments of this disclosure. The method P100 is a method for selecting a target audio processing mode of the electronic device 200 by a system 100 based on signal strength of a speaker signal. As shown in FIG. 5:

S120. Select a target audio processing mode of an electronic device 200 from a first mode 1 and a second mode 2 based on at least one speaker signal. As described above, the target audio processing mode may include one of the first mode 1 and the second mode 2. Specifically, step S120 may include:

S121. Obtain the speaker signal.

S122. Generate, based on at least strength of the speaker signal, a control signal corresponding to the speaker signal. The control signal may include a first control signal or a second control signal. Specifically, the electronic device 200 may receive the speaker signal sent by a control device 400, compare the strength of the speaker signal with a preset speaker threshold, and generate the control signal based on a comparison result. Step S122 may include one of the following cases:

S122-2. Determine that the strength of the speaker signal is lower than the speaker threshold, and generate the first control signal; or S122-4. Determine that the strength of the speaker signal is higher than the preset speaker threshold, and generate the second control signal.

Step S120 may further include:

S124. Select, based on the control signal, the target audio processing mode corresponding to the control signal. The first control signal corresponds to the first mode 1. The second control signal corresponds to the second mode 2. When the control signal is the first control signal, the first mode 1 is selected; or when the control signal is the second control signal, the second mode 2 is selected.

When the strength of the speaker signal is higher than the speaker threshold, and a first algorithm 233-1 in the first mode 1 is used to perform signal processing on a first audio signal 243 and a second audio signal 245, since it may be impossible to cancel an echo signal therein and meanwhile maintain a good human voice signal, voice quality of the obtained first target audio 291 may be poor, but quality of the second target audio 292 obtained by performing signal processing on the second audio signal 245 by using a second algorithm 233-8 in the second mode 2 may be good. Therefore, when the strength of the speaker signal is higher than the speaker threshold, the electronic device 200 may generate the second control signal corresponding to the second mode 2.

When the strength of the speaker signal is lower than the speaker threshold, and the first algorithm 233-1 in the first mode 1 is used to perform signal processing on the first audio signal 243 and the second audio signal 245, since it may be impossible to cancel the echo signal therein while maintaining a good human voice signal, voice quality of the obtained first target audio 291 may be good, and quality of the second target audio 292 obtained by performing signal processing on the second audio signal 245 by using the second algorithm 233-8 in the second mode 2 may also be good. Therefore, when the strength of the speaker signal is lower than the speaker threshold, the electronic device 200 may generate the first control signal corresponding to the first mode 1, and may also generate the second control signal corresponding to the second mode 2.

The control signal may be generated by a control module 231. Specifically, the electronic device 200 may monitor the strength of the speaker signal in real time, and compare the strength of the speaker signal with the speaker threshold. The electronic device 200 may also detect the strength of the speaker signal regularly, and compare the strength of the speaker signal with the speaker threshold. When detecting that the strength of the speaker signal changes significantly and that a change value exceeds a preset range, the electronic device 200 may further compare the strength of the speaker signal with the speaker threshold.

When the strength of the speaker signal is higher than the speaker threshold, the electronic device 200 may generate the second control signal; when the speaker signal changes, and the strength of the speaker signal is lower than the speaker threshold, the electronic device may generate the first control signal. When the strength of the speaker signal is lower than the speaker threshold, the electronic device 200 generates the first control signal; when the speaker signal changes, and the strength of the speaker signal is higher than the speaker threshold, the electronic device may generate the second control signal.

To ensure that switching of the control signal is not perceived by a user 002, the speaker threshold may be a range. The speaker threshold may be within a range in which a first speaker critical value and a second speaker critical value are located. The first speaker critical value is less than the second speaker critical value. That the strength of the speaker signal is higher than the speaker threshold may include that the strength of the speaker signal is higher than the second speaker critical value. That the strength of the speaker signal is lower than the speaker threshold may include that the strength of the speaker signal is lower than the first speaker critical value.

When the strength of the speaker signal is equal to the speaker threshold, the electronic device 200 may generate the first control signal or the second control signal. When the strength of the speaker signal is higher than the second speaker critical value, the electronic device 200 may generate the second control signal; or when the strength of the speaker signal is reduced to a value between the first speaker critical value and the second speaker critical value, the electronic device 200 may generate the second control signal. When the strength of the speaker signal is lower than the first speaker critical value, the electronic device 200 may generate the first control signal; or when the strength of the speaker signal increases to a value between the first speaker critical value and the second speaker critical value, the electronic device 200 may generate the first control signal.

The electronic device 200 may also obtain a control model through machine learning and input the speaker signal to the control model, and the control model outputs the control signal.

The method P100 may further include the following step performed by the at least one processor 220:

S140. Generate the target audio by processing a microphone signal in the target audio processing mode to reduce at least an echo in the microphone signal. Specifically, step S140 may include one of the following cases:

S142. Determine that the control signal is the first control signal, perform signal processing and feature fusion on the first audio signal 243 and the second audio signal 245 based on a speaker input signal by using the first algorithm 233-1 in the first mode 1 corresponding to the first control signal, and generate the first target audio 291. The specific process thereof has been described above, and is not described again herein.

S144. Determine that the control signal is the second control signal, and perform signal processing on the second audio signal 245 based on the speaker input signal by using the second algorithm 233-8 in the second mode 2 corresponding to the second control signal. The specific process thereof has been described above, and is not described again herein.

S160. Output the target audio. The electronic device 200 may directly output the target audio. The electronic device 200 may also perform smoothing processing on the target audio, so that switching of the target audio between the first target audio 291 and the second target audio 292 may not be perceived by the user 002. Specifically, step S160 may include: performing smoothing processing on the target audio and outputting the target audio after the smoothing processing.

Specifically, the electronic device 200 may perform smoothing processing on the target audio by using a microphone control module 235. When the target audio switches between the first target audio 291 and the second target audio 292, the microphone control module 235 may perform the smoothing processing on a joint between the first target audio 291 and the second target audio 292, that is, make a signal adjustment to the first target audio 291 and the second target audio 292 to implement a smooth transition at the joint.

The method P100 may further include:

S180. Control strength of a speaker input signal of a speaker 280 based on the control signal. Specifically, step S180 may be performed by a speaker control module 237. Step S180 may include: determining the control signal as the first control signal by using the speaker control module 237. The speaker control module 237 processes a processed speaker signal to reduce strength of the speaker input signal input to the speaker 280, so as to reduce strength of sound output by the speaker 280, and reduce an echo signal in the microphone signal to improve voice quality of the first target audio.

Table 1 shows a result of target audio processing mode corresponding to FIG. 5. As shown in Table 1, for ease of comparison, scenarios are classified into four scenarios: a first scenario in which a near-end sound signal is lower than a threshold (for example, the user 002 does not generate sound) and the speaker signal does not exceed the speaker threshold; a second scenario in which a near-end sound signal is higher than a threshold (for example, the user 002 generates sound) and the speaker signal does not exceed the speaker threshold; a third scenario in which a near-end sound signal is lower than a threshold (for example, the user 002 does not generate sound) and the speaker signal exceeds the speaker threshold; and a fourth scenario in which a near-end sound signal is higher than a threshold (for example, the user 002 generates sound) and the speaker signal exceeds the speaker threshold. Whether a near-end sound signal is higher than a threshold may be determined by the control module 231 based on the microphone signal. That a near-end sound signal is higher than a threshold may be that strength of an audio signal generated by the user 002 exceeds a preset threshold. Target audio processing modes corresponding to the four scenarios are as follows: the first mode 1 corresponding to the first and second scenarios, and the second mode 2 corresponding to the third and fourth scenarios.

TABLE 1

|  | A near-end sound signal is higher than a threshold | A near-end sound signal is lower than a threshold |
| --- | --- | --- |
| The speaker signal is lower than the speaker threshold | 1 | 1 |
| The speaker signal is higher than the speaker threshold | 2 | 2 |

In the method P100, the electronic device 200 may select the target audio processing mode of the electronic device 200 based on the speaker signal, in order to ensure that voice quality processed in the target audio processing mode selected by the electronic device 200 in any scenario is the best, and ensure communication quality.

In some exemplary embodiments, the selection of the target audio processing mode is not only related to an echo of the speaker signal but also related to ambient noise. The ambient noise may be evaluated by using at least one of an ambient noise level or a signal-to-noise ratio in the microphone signal.

Figure 6:
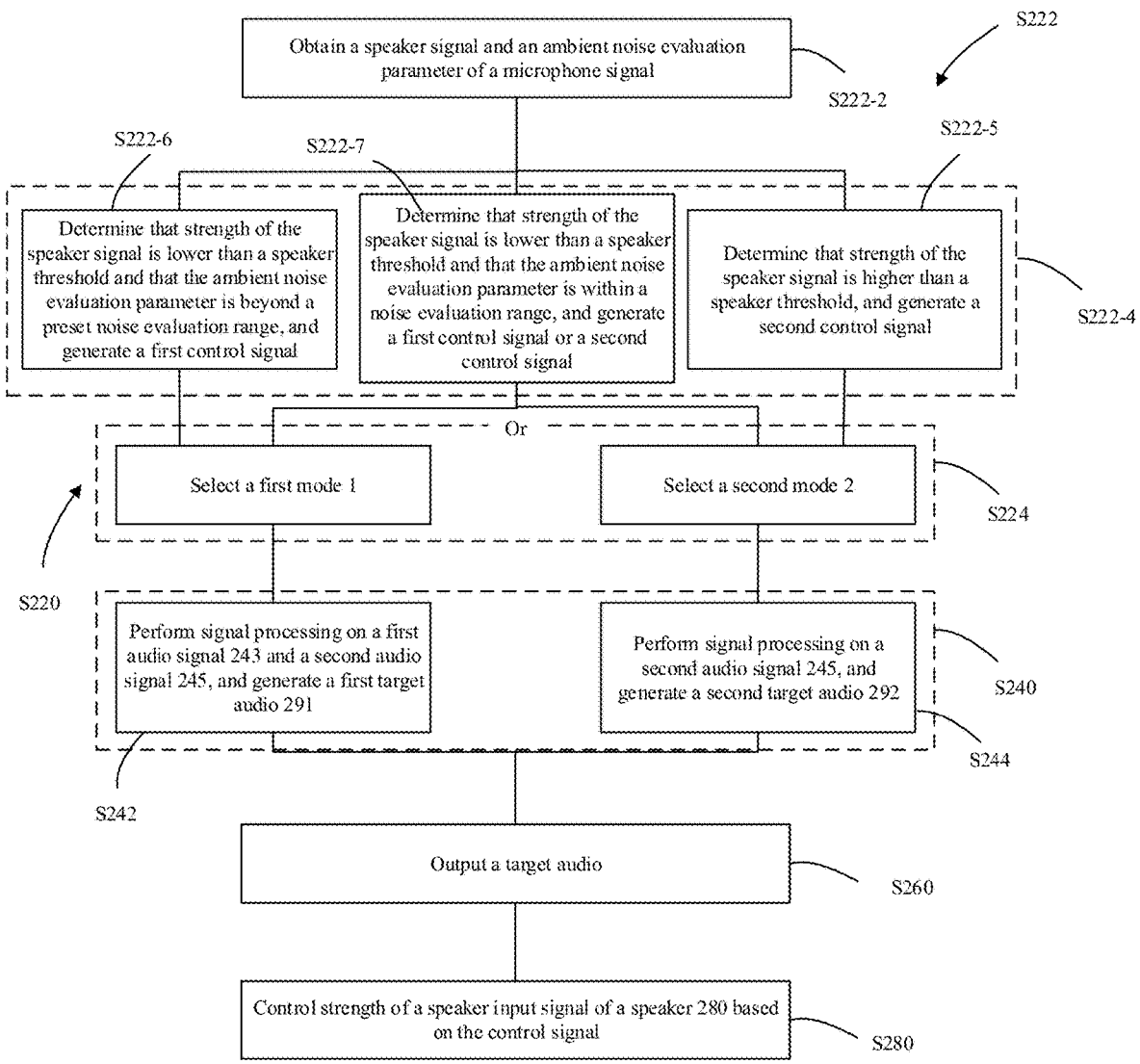
FIG. 6 is a flowchart of an audio signal processing method for echo suppression according to some exemplary embodiments of this disclosure.

FIG. 6 is a flowchart of an audio signal processing method P200 for echo suppression according to some exemplary embodiments of this disclosure. The method P200 is a flowchart of a method for selecting the target audio processing mode of the electronic device 200 by the system 100 based on the signal strength of the speaker signal and the microphone signal. Specifically, the method P200 is a flowchart of a method for selecting the target audio processing mode by the system 100 based on the speaker signal and at least one of an ambient noise level and a signal-to-noise ratio in the microphone signal. The method P200 may include the following step performed by at least one processor 220:

S220. Select a target audio processing mode of an electronic device 200 from a first mode 1 and a second mode 2 based on at least the speaker signal. Specifically, step S220 may include:

S222. Generate, based on at least strength of the speaker signal, a control signal corresponding to the speaker signal. The control signal includes a first control signal or a second control signal. Specifically, step S222 may include: the electronic device 200 generates a corresponding control signal based on the strength of the speaker signal and noise in a microphone signal. Step S222 may include:

S222-2. Obtain the speaker signal and an evaluation parameter of the microphone signal. The evaluation parameter may be an ambient noise evaluation parameter in the microphone signal. The ambient noise evaluation parameter may include at least one of an ambient noise level or a signal-to-noise ratio. The electronic device 200 may obtain the ambient noise evaluation parameter in the microphone signal by using a control module 231. Specifically, the electronic device 200 may obtain the ambient noise evaluation parameter based on at least one of a first audio signal 243 and a second audio signal 245. The electronic device 200 may obtain the ambient noise level and the signal-to-noise ratio by using a noise estimation algorithm. This is not described again herein.

S222-4. Generate the control signal based on the strength of the speaker signal and the ambient noise evaluation parameter. Specifically, the electronic device 200 may compare the strength of the speaker signal with a preset speaker threshold, compare the ambient noise evaluation parameter with a preset noise evaluation range, and generate the control signal based on comparison results. Step S222-4 may include one of the following cases:

S222-5. Determine that the strength of the speaker signal is higher than the preset speaker threshold, and generate the second control signal.

S222-6. Determine that the strength of the speaker signal is lower than the speaker threshold and that the ambient noise evaluation parameter is beyond the preset noise evaluation range, and generate the first control signal.

S222-7. Determine that the strength of the speaker signal is lower than the speaker threshold and that the ambient noise evaluation parameter is within the noise evaluation range, and generate the first control signal or the second control signal.

That the ambient noise evaluation parameter is within the noise evaluation range may include that the ambient noise level is lower than a preset ambient noise threshold and/or that the signal-to-noise ratio is higher than a preset signal-to-noise ratio threshold. Ambient noise in this case is low. That the ambient noise evaluation parameter is beyond the noise evaluation range may include that the ambient noise level is higher than the preset ambient noise threshold and/or that the signal-to-noise ratio is lower than the preset signal-to-noise ratio threshold. Ambient noise in this case is high. When the ambient noise evaluation parameter is beyond the noise evaluation range, that is, in a high noise environment, voice quality of the first target audio 291 may be better than that of the second target audio 292. When the ambient noise evaluation parameter is within the noise evaluation range, there is no significant difference between voice quality of the first target audio 291 and voice quality of the second target audio 292.

Step S220 may further include:

S224. Select, based on the control signal, the target audio processing mode corresponding to the control signal. The first control signal corresponds to the first mode 1. The second control signal corresponds to the second mode 2. When the control signal is the first control signal, the first mode 1 may be selected; or when the control signal is the second control signal, the second mode 2 may be selected.

When the strength of the speaker signal is higher than the speaker threshold, and a first algorithm 233-1 in the first mode 1 is used to perform signal processing on the first audio signal 243 and the second audio signal 245, since it is impossible to cancel an echo signal while maintaining a good human voice signal, voice quality of the obtained first target audio 291 is poor, but quality of the second target audio 292 obtained by performing signal processing on the second audio signal 245 by using a second algorithm 233-8 in the second mode 2 is good. Therefore, when the strength of the speaker signal is higher than the speaker threshold, regardless of which range the ambient noise is in, the electronic device 200 may generate the second control signal corresponding to the second mode 2.

When the strength of the speaker signal is lower than the speaker threshold, and the first algorithm 233-1 in the first mode 1 is used to perform signal processing on the first audio signal 243 and the second audio signal 245, since it is impossible to cancel the echo signal while maintaining a good human voice signal, voice quality of the obtained first target audio 291 is good, and quality of the second target audio 292 obtained by performing signal processing on the second audio signal 245 by using the second algorithm 233-8 in the second mode 2 is also good. Therefore, when the strength of the speaker signal is lower than the speaker threshold, the control signal generated by the electronic device 200 may be related to the ambient noise.

When the ambient noise level is higher than the ambient noise threshold or the signal-to-noise ratio is lower than the signal-to-noise ratio threshold, it indicates that the ambient noise in the microphone signal is high. When the first algorithm 233-1 in the first mode 1 is used to perform signal processing on the first audio signal 243 and the second audio signal 245, since it is impossible to reduce the noise while maintaining a good human voice signal, voice quality of the obtained first target audio 291 is good, but voice quality of the second target audio 292 obtained by performing signal processing on the second audio signal 245 by using the second algorithm 233-8 in the second mode 2 is not as good as the voice quality of the first target audio 291. Therefore, when the strength of the speaker signal is lower than the speaker threshold, and the ambient noise level is higher than the ambient noise threshold or the signal-to-noise ratio is lower than the signal-to-noise ratio threshold, the electronic device 200 may generate the first control signal corresponding to the first mode 1.

It should be noted that when the ambient noise is low, that is, the ambient noise evaluation parameter is within the noise evaluation range; there is no significant difference between voice quality of the first target audio 291 and voice quality of the second target audio 292. In this case, the electronic device 200 may always generate the second control signal, and the second algorithm 233-8 in the second mode 2 may be selected to perform signal processing on the second audio signal 245. This may reduce a computation amount and save resources while ensuring voice quality of the target audio.

When the ambient noise level is lower than the ambient noise threshold or the signal-to-noise ratio is higher than the signal-to-noise ratio threshold, it indicates that the ambient noise in the microphone signal is low. Voice quality of the first target audio 291 obtained by performing signal processing on the first audio signal 243 and the second audio signal 245 by using the first algorithm 233-1 in the first mode 1, and voice quality of the second target audio 292 obtained by performing signal processing on the second audio signal 245 by using the second algorithm 233-8 in the second mode 2 may both be good. Therefore, when the strength of the speaker signal is lower than the speaker threshold, and the ambient noise level is lower than the ambient noise threshold or the signal-to-noise ratio is higher than the signal-to-noise ratio threshold, the electronic device 200 may generate the first control signal or the second control signal. Specifically, the electronic device 200 may determine a control signal in a current scenario based on a control signal in a previous scenario. To be specific, the electronic device generates the first control signal in the previous scenario, and the electronic device may also generate the first control signal in the current scenario, thereby ensuring signal continuity, or vice versa.

The control signal may be generated by the control module 231. Specifically, the electronic device 200 may monitor the strength of the speaker signal and the ambient noise evaluation parameter in real time, and compare them with the speaker threshold and the noise evaluation range. The electronic device 200 may also detect the strength of the speaker signal and the ambient noise evaluation parameter regularly, and compare them with the speaker threshold and the noise evaluation range. When detecting that the strength of the speaker signal or the ambient noise evaluation parameter changes significantly and that a change value exceeds a preset range, the electronic device 200 may further compare the speaker signal and the ambient noise evaluation parameter with the speaker threshold and the noise evaluation range.

To ensure that switching of the control signal is not perceived by the user 002, the speaker threshold, the ambient noise threshold, and the preset signal-to-noise ratio threshold may each be a range. The speaker threshold has been described above, and is not described again herein. The ambient noise threshold may be within a range in which a first noise critical value and a second noise critical value are located. The first noise critical value may be less than the second noise critical value. That the ambient noise level is higher than the ambient noise threshold may include that the ambient noise level is higher than the second noise critical value. That the ambient noise level is lower than the ambient noise threshold may include that the ambient noise level is lower than the first noise critical value. The signal-to-noise ratio threshold may be within a range in which a first signal-to-noise ratio critical value and a second signal-to-noise ratio critical value are located. The first signal-to-noise ratio critical value is less than the second signal-to-noise ratio critical value. That the signal-to-noise ratio is higher than the signal-to-noise ratio threshold may include that the signal-to-noise ratio is higher than the second signal-to-noise ratio critical value. That the signal-to-noise ratio is lower than the signal-to-noise ratio threshold may include that the signal-to-noise ratio is lower than the first signal-to-noise ratio critical value.

The method P200 may include the following step performed by the at least one processor 220:

S240. Generate the target audio by processing the microphone signal in the target audio processing mode, to reduce at least an echo in the microphone signal. Specifically, step S240 may include one of the following cases:

S242. Determine that the control signal is the first control signal, select the first mode 1, and perform signal processing on the first audio signal 243 and the second audio signal 245 to generate the first target audio 291. Specifically, step S242 may be consistent with step S142, and is not described again herein.

S244. Determine that the control signal is the second control signal, select the second mode 2, and perform echo suppression on the second audio signal 245 to generate the second target audio 292. Specifically, step S244 may be consistent with step S144, and is not described again herein.

S260. Output the target audio. Specifically, step S260 may be consistent with step S160, and is not described again herein.

The method P200 may further include:

S280. Control strength of the speaker input signal of the speaker 280 based on the control signal. Specifically, step S280 may be consistent with step S180, and is not described again herein.

Table 2 shows a result of a target audio processing mode corresponding to FIG. 6. As shown in Table 2, for ease of comparison, scenarios are classified into eight scenarios: a first scenario in which a near-end sound signal is lower than a threshold (for example, the user 002 does not generate sound), the speaker signal does not exceed the speaker threshold, and the ambient noise is low; a second scenario in which a near-end sound signal is higher than a threshold (for example, the user 002 generates sound), the speaker signal does not exceed the speaker threshold, and the ambient noise is low; a third scenario in which a near-end sound signal is lower than a threshold (for example, the user 002 does not generate sound), the speaker signal exceeds the speaker threshold, and the ambient noise is low; a fourth scenario in which a near-end sound signal is higher than a threshold (for example, the user 002 generates sound), the speaker signal exceeds the speaker threshold, and the ambient noise is low; a fifth scenario in which a near-end sound signal is lower than a threshold (for example, the user 002 does not generate sound), the speaker signal does not exceed the speaker threshold, and the ambient noise is high; a sixth scenario in which a near-end sound signal is higher than a threshold (for example, the user 002 generates sound), the speaker signal does not exceed the speaker threshold, and the ambient noise is high; a seventh scenario in which a near-end sound signal is lower than a threshold (for example, the user 002 does not generate sound), the speaker signal exceeds the speaker threshold, and the ambient noise is high; and an eighth scenario in which a near-end sound signal is higher than a threshold (for example, the user 002 generates sound), the speaker signal exceeds the speaker threshold, and the ambient noise is high. Whether a near-end sound signal is higher than a threshold may be determined by the control module 231 based on the microphone signal. That a near-end sound signal is higher than a threshold may include that strength of an audio signal generated by the user 002 exceeds a preset threshold. Target audio processing modes corresponding to the eight scenarios are as follows: the first mode 1 corresponding to the fifth and sixth scenarios, the second mode 2 corresponding to the third, fourth, seventh, and eighth scenarios, and the first mode 1 or the second mode 2 corresponding to remaining scenarios.

embodiments of this disclosure. The method P300 is a method for selecting the target audio processing mode of the electronic device 200 by the system 100 based on the signal strength of the speaker signal and the microphone signal. Specifically, the method P300 is a method for selecting the target audio processing mode by the system 100 based on the speaker signal, human voice signal strength in the microphone signal, and at least one of an ambient noise level and a signal-to-noise ratio. The method P300 may include the following step performed by at least one processor 220:

S320. Select a target audio processing mode of an electronic device 200 from a first mode 1 and a second mode 2 based on at least the speaker signal. Specifically, step S320 may include:

S322. Generate, based on at least strength of the speaker signal, a control signal corresponding to the speaker signal. The control signal includes a first control signal or a second control signal. Step S320 may include: the electronic device 200 generates a corresponding control signal based on the strength of the speaker signal, noise in the microphone signal, and human voice signal strength in the microphone signal. Specifically, step S322 may include:

S322-2. Obtain the speaker signal and an evaluation parameter of the microphone signal. The evaluation parameter may include an ambient noise evaluation parameter in the microphone signal, and may further include the human voice signal strength in the microphone signal. The ambient noise evaluation parameter may include at least one of an ambient noise level and

TABLE 2

| | A near-end sound signal is lower than a threshold, and the speaker signal is lower than the speaker threshold | A near-end sound signal is higher than a threshold, and the speaker signal is lower than the speaker threshold | A near-end sound signal is lower than a threshold, and the speaker signal is higher than the speaker threshold | A near-end sound signal is higher than a threshold, and the speaker signal is higher than the speaker threshold |
|---|---|---|---|---|
| The noise is low | 1 or 2 | 1 or 2 | 2 | 2 |
| The noise is high | 1 | 1 | 2 | 2 |

The method P200 may not only control the target audio processing mode of the electronic device 200 based on the speaker signal, but also control the target audio processing mode based on a near-end ambient noise signal, so as to ensure that voice quality of the voice signal output by the electronic device 200 in different scenarios is the best, and ensure communication quality.

In some exemplary embodiments, the selection of the target audio processing mode is not only related to an echo of the speaker signal and the ambient noise, but also related to the voice signal when the user 002 speaks. The ambient noise signal may be evaluated by using at least one of the ambient noise level or the signal-to-noise ratio in the microphone signal. The voice signal when the user 002 speaks may be evaluated by using human voice signal strength in the microphone signal. The human voice signal strength may be human voice signal strength obtained by using the noise estimation algorithm, or the human voice signal strength may be strength of an audio signal obtained by performing noise reduction processing.

Figure 7:
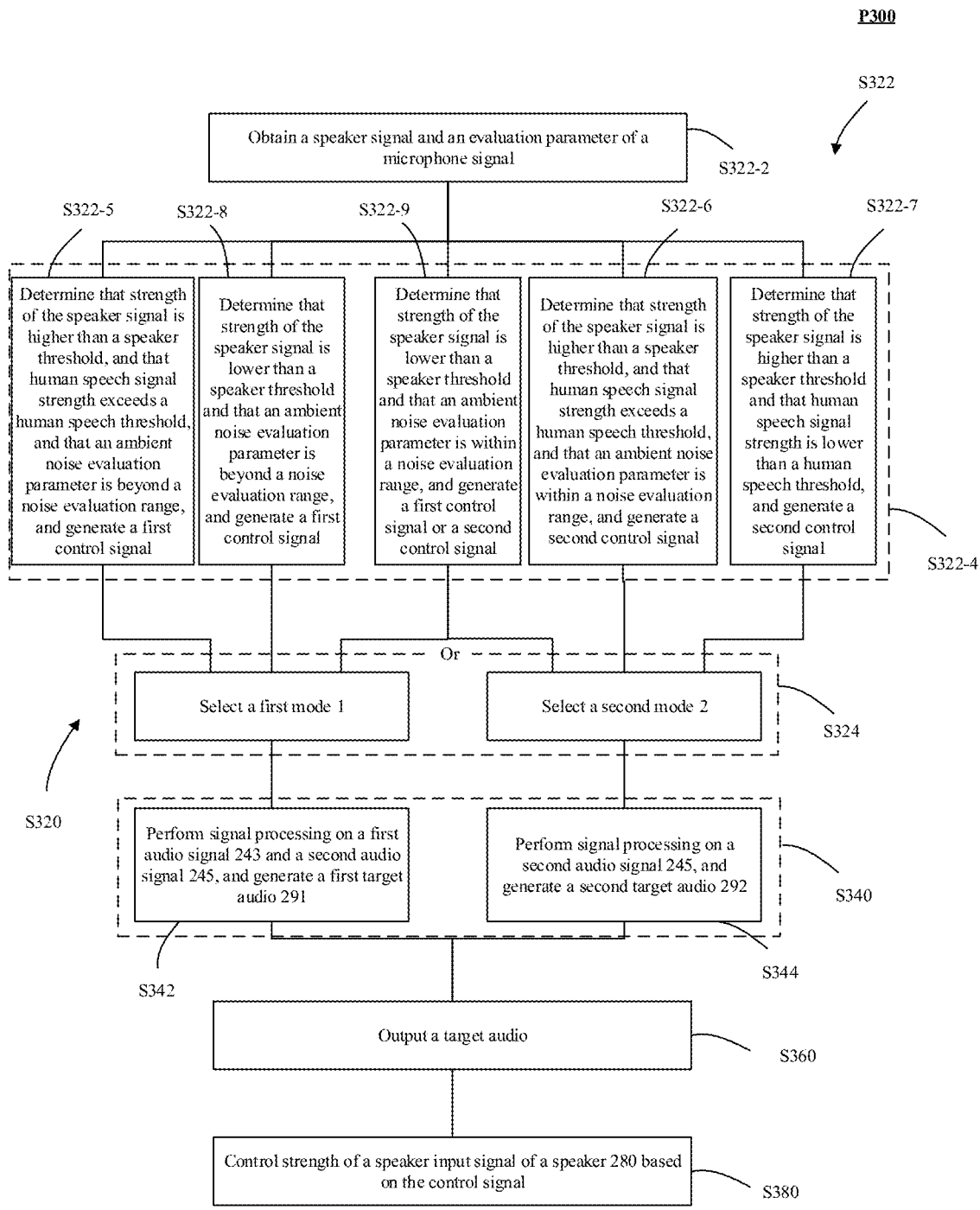
FIG. 7 is a flowchart of an audio signal processing method for echo suppression according to some exemplary embodiments of this disclosure.

FIG. 7 is a flowchart of an audio signal processing method P300 for echo suppression according to some exemplary a signal-to-noise ratio. The electronic device 200 may obtain the ambient noise evaluation parameter and the human voice signal strength in the microphone signal by using a control module 231. Specifically, the electronic device 200 may obtain the evaluation parameter based on at least one of a first audio signal 243 or a second audio signal 245. The electronic device 200 may obtain the human voice signal strength and the ambient noise level and the signal-to-noise ratio by using a noise estimation algorithm. This is not described again herein in this disclosure.

S322-4. Generate the control signal based on the strength of the speaker signal and the evaluation parameter. Specifically, the electronic device 200 may compare the strength of the speaker signal with a preset speaker threshold, compare the ambient noise evaluation parameter with a preset noise evaluation range, compare the human voice signal strength with a preset human voice threshold, and generate the control signal based on comparison results. Step S322-4 may include one of the following cases:

S322-5. Determine that the strength of the speaker signal is higher than the preset speaker threshold, and that the human voice signal strength exceeds the human voice threshold, and that the ambient noise evaluation parameter is beyond the preset noise evaluation range, and generate the first control signal.

S322-6. Determine that the strength of the speaker signal is higher than the speaker threshold, and that the human voice signal strength exceeds the human voice threshold, and that the ambient noise evaluation parameter is within the noise evaluation range, and generate the second control signal.

S322-7. Determine that the strength of the speaker signal is higher than the speaker threshold and that the human voice signal strength is lower than the human voice threshold, and generate the second control signal.

S322-8. Determine that the strength of the speaker signal is lower than the speaker threshold and that the ambient noise evaluation parameter is beyond the noise evaluation range, and generate the first control signal.

S322-9. Determine that the strength of the speaker signal is lower than the speaker threshold and that the ambient noise evaluation parameter is within the noise evaluation range, and generate the first control signal or the second control signal.

That the ambient noise evaluation parameter is within the noise evaluation range may include that the ambient noise level is lower than a preset ambient noise threshold and/or that the signal-to-noise ratio is higher than a preset signal-to-noise ratio threshold. Ambient noise in this case is low. That the ambient noise evaluation parameter is beyond the noise evaluation range may include that the ambient noise level is higher than the preset ambient noise threshold and/or that the signal-to-noise ratio is lower than the preset signal-to-noise ratio threshold. Ambient noise in this case is high. When the ambient noise evaluation parameter is beyond the noise evaluation range, that is, in a high noise environment, voice quality of the first target audio 291 may be better than that of the second target audio 292. When the ambient noise evaluation parameter is within the noise evaluation range, there is no significant difference between voice quality of the first target audio 291 and voice quality of the second target audio 292. The speaker threshold, the ambient noise threshold, and the signal-to-noise ratio threshold have been described above, and are not described again herein.

That the human voice signal strength exceeds the human voice threshold indicates that a user 002 is speaking. In this case, to ensure voice quality of the user 002, the electronic device 200 may generate the first control signal, and reduce the speaker signal to ensure voice quality of the first target audio 292.

The speaker threshold, the ambient noise threshold, the signal-to-noise ratio threshold, and the human voice threshold may be pre-stored in the electronic device 200.

Step S320 may further include:

S324. Select, based on the control signal, the target audio processing mode corresponding to the control signal. The first control signal corresponds to the first mode 1. The second control signal corresponds to the second mode 2. When the control signal is the first control signal, the first mode 1 is selected; or when the control signal is the second control signal, the second mode 2 is selected.

When the strength of the speaker signal is higher than the speaker threshold, the human voice signal strength exceeds the human voice threshold, and the ambient noise evaluation parameter is beyond the preset noise evaluation range, it indicates that the user 002 is speaking with a high echo and high noise. To ensure voice quality and voice intelligibility of the user 002, the electronic device 200 may reduce or even disable a speaker input signal input to a speaker 280, so as to reduce an echo in the microphone signal, and ensure voice quality of the target audio. In this case, voice quality of the first target audio 291 obtained by performing signal processing on the first audio signal 243 and the second audio signal 245 by using a first algorithm 233-1 in the first mode 1 is better than voice quality of the second target audio 292 obtained by performing signal processing on the second audio signal 245 by using a second algorithm 233-8 in the second mode 2. Therefore, when the strength of the speaker signal is higher than the speaker threshold, the human voice signal strength exceeds the human voice threshold, and the ambient noise evaluation parameter is beyond the preset noise evaluation range, the electronic device 200 may generate the first control signal corresponding to the first mode 1. In this case, the electronic device 200 may ensure voice intelligibility and voice quality of the near-end user 002. Although a part of the speaker input signal is omitted, the electronic device 200 may reserve most voice quality and voice intelligibility of the speaker input signal, and therefore improve voice communication quality of both parties.

When the strength of the speaker signal is higher than the speaker threshold, the human voice signal strength is lower than the human voice threshold or the human voice signal strength exceeds the human voice threshold, and the ambient noise evaluation parameter is within the preset noise evaluation range, it indicates that the user 002 does not speak or that the user 002 is speaking with low noise. In this case, voice quality of the first target audio 291 obtained by performing signal processing on the first audio signal 243 and the second audio signal 245 by using the first algorithm 233-1 in the first mode 1 may be poorer than voice quality of the second target audio 292 obtained by performing signal processing on the second audio signal 245 by using the second algorithm 233-8 in the second mode 2. Therefore, when the strength of the speaker signal is higher than the speaker threshold, the human voice signal strength is lower than the human voice threshold or the human voice signal strength exceeds the human voice threshold, and the ambient noise evaluation parameter is within the preset noise evaluation range, the electronic device 200 may generate the second control signal corresponding to the second mode 2.

Other cases in step S322-4 are basically the same as those in step S222-4, and are not described again herein.

The control signal is generated by the control module 231. Specifically, the electronic device 200 may monitor the strength of the speaker signal and the evaluation parameter in real time, and compare them with the speaker threshold, the noise evaluation range, and the human voice threshold. The electronic device 200 may also detect the strength of the speaker signal and the evaluation parameter regularly, and compare them with the speaker threshold, the noise evaluation range, and the human voice threshold. When detecting that the strength of the speaker signal or the evaluation parameter changes significantly and that a change value exceeds a preset range, the electronic device 200 may further compare the speaker signal and the evaluation parameter with the speaker threshold, the noise evaluation range, and the human voice threshold.

The method P300 may include the following step performed by the at least one processor 220:

S340. Generate the target audio by processing the microphone signal in the target audio processing mode to reduce at least an echo in the microphone signal. Specifically, step S340 may include one of the following cases:

S342. Determine that the control signal is the first control signal, select the first mode 1, and perform signal processing on the first audio signal 243 and the second audio signal 245 to generate the first target audio 291. Specifically, step S342 may be consistent with step S142, and is not described again herein.

S344. Determine that the control signal is the second control signal, select the second mode 2, and perform signal processing on the second audio signal 245 to generate the second target audio 292. Specifically, step S344 may be consistent with step S144, and is not described again herein.

The method P300 may include the following step performed by the at least one processor 220:

S360. Output the target audio. Specifically, step S360 may be consistent with step S160, and is not described again herein.

does not exceed the speaker threshold, and the ambient noise is high; a seventh scenario in which a near-end sound signal is lower than a threshold (for example, the user 002 does not generate sound), the speaker signal exceeds the speaker threshold, and the ambient noise is high; and an eighth scenario in which a near-end sound signal is higher than a threshold (for example, the user 002 generates sound), the speaker signal exceeds the speaker threshold, and the ambient noise is high. Whether a near-end sound signal is higher than a threshold may be determined by the control module 231 based on the microphone signal. That a near-end sound signal is higher than a threshold may include that strength of an audio signal generated by the user 002 exceeds a preset threshold. Target audio processing modes corresponding to the eight scenarios are as follows: the first mode 1 corresponding to the fifth, sixth, and eighth scenarios, the second mode 2 corresponding to the third, fourth, and seventh scenarios, and the first mode 1 or the second mode 2 corresponding to remaining scenarios.

TABLE 3

|  | A near-end sound signal is lower than a threshold, and the speaker signal is lower than the speaker threshold | A near-end sound signal is higher than a threshold, and the speaker signal is lower than the speaker threshold | A near-end sound signal is lower than a threshold, and the speaker signal is higher than the speaker threshold | A near-end sound signal is higher than a threshold, and the speaker signal is higher than the speaker threshold |
|---|---|---|---|---|
| The noise is low | 1 or 2 | 1 or 2 | 2 | 2 |
| The noise is high | 1 | 1 | 2 | 1 |

The method P300 may further include:

S380. Control strength of the speaker input signal of the speaker 280 based on the control signal. Specifically, step S380 may be consistent with step S180, and is not described again herein.

Table 3 shows a result of a target audio processing mode corresponding to FIG. 7. As shown in Table 3, for ease of comparison, scenarios are classified into eight scenarios: a first scenario in which a near-end sound signal is lower than a threshold (for example, the user 002 does not generate sound), the speaker signal does not exceed the speaker threshold, and the ambient noise is low; a second scenario in which a near-end sound signal is higher than a threshold (for example, the user 002 generates sound), the speaker signal does not exceed the speaker threshold, and the ambient noise is low; a third scenario in which a near-end sound signal is lower than a threshold (for example, the user 002 does not generate sound), the speaker signal exceeds the speaker threshold, and the ambient noise is low; a fourth scenario in which a near-end sound signal is higher than a threshold (for example, the user 002 generates sound), the speaker signal exceeds the speaker threshold, and the ambient noise is low; a fifth scenario in which a near-end sound signal is lower than a threshold (for example, the user 002 does not generate sound), the speaker signal does not exceed the speaker threshold, and the ambient noise is high; a sixth scenario in which a near-end sound signal is higher than a threshold (for example, the user 002 generates sound), the speaker signal It should be noted that the method P200 and the method P300 may be applicable to different application scenarios. In a scenario in which the speaker signal is more important than quality of a near-end voice, to ensure quality of the speaker signal and voice intelligibility of the speaker signal, the method P200 may be selected. In a scenario in which quality of a near-end voice is more important than the speaker signal, to ensure voice quality and voice intelligibility of the near-end voice, the method P300 may be selected.

In summary, the system 100, the method P100, the method P200, and the method P300 may control the target audio processing mode of the electronic device 200 based on the speaker signal in different scenarios, and therefore control the sound source signal of the electronic device 200, so that voice quality of the target audio in any scenario is the best and that voice communication quality is improved.

It should be noted that signal strength of ambient noise varies in different frequencies. In different frequencies, voice quality of the first target audio 291 and the second target audio 292 also varies. For example, at a first frequency, voice quality of the first target audio 291 obtained by performing signal processing on the first audio signal 243 and the second audio signal 245 by using the first algorithm 233-1 may be better than voice quality of the second target audio 292 obtained by performing signal processing on the second audio signal 245 by using the second algorithm 233-8. However, at a frequency other than the first frequency, voice quality of the first target audio 291 obtained by performing signal processing on the first audio signal 243 and the second audio signal 245 by using the first algorithm 233-1 may be close to voice quality of the second target audio 292 obtained by performing signal processing on the second audio signal 245 by using the second algorithm 233-8. In this case, the electronic device 200 may further generate the control signal based on a frequency of the ambient noise. The electronic device 200 may generate the first control signal in the first frequency, and generate the second control signal in the other frequencies than the first frequency.

When the ambient noise is low-frequency noise (for example, in some cases such as a subway or a bus), quality of the voice signal of the first target audio 291 obtained by performing signal processing on the first audio signal 243 and the second audio signal 245 by using the first algorithm 233-1 may be poor at a low frequency, that is, voice intelligibility of the first target audio 291 may be poor at a low frequency, yet voice intelligibility of the first target audio 291 may be high at a high frequency. In this case, the electronic device 200 may control the selection of the target audio processing mode based on the frequency of the ambient noise. For example, in a low frequency range, the electronic device 200 may select the method P300 to control the target audio processing mode to ensure that a voice of the near-end user 002 is picked, and ensure quality of the near-end voice; in a high frequency range, the electronic device 200 may select the method P200 to control the target audio processing mode to ensure that the near-end user 002 can hear the speaker signal.

Another aspect of this disclosure provides a non-transitory storage medium. The non-transitory storage medium stores at least one set of executable instructions for control based on a sound source signal, and when the executable instructions are executed by a processor, the executable instructions instruct the processor to implement steps of the audio signal processing method for echo suppression that is described in this disclosure. In some exemplary embodiments, each aspect of this disclosure may be further implemented in a form of a program product, where the program product may include program code. When the program product operates on the electronic device 200, the program code may be used to enable the electronic device 200 to perform steps of control based on a sound source signal that is described in this disclosure. The program product for implementing the aforementioned method may use a portable compact disc read-only memory (CD-ROM) including program code, and may operate on the electronic device 200. However, the program product in this disclosure is not limited thereto. In this disclosure, a readable storage medium may be any tangible medium containing or storing a program, and the program may be used by or in connection with an instruction execution system (for example, the processor 220). The program product may use any combination of one or more readable media. The readable medium may be a readable signal medium or a readable storage medium. For example, the readable storage medium may be but is not limited to an electronic, magnetic, optical, electromagnetic, infrared, or semi-conductor system, device, or device, or any combination thereof. More specific examples of the readable storage medium may include: an electrical connection having one or more conducting wires, a portable diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any appropriate combination thereof. The readable storage medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. Alternatively, the readable storage medium may be any readable medium other than the readable storage medium. The readable medium may send, propagate, or transmit a program used by or in connection with an instruction execution system, device, or device. The program code contained in the readable storage medium may be transmitted through any appropriate medium, including but not limited to wireless or wired medium, an optical cable, RF, or the like, or any appropriate combination thereof. Any combination of one or more programming languages may be used to compile program code for performing operations in this disclosure. The programming languages include object-oriented programming languages such as Java and C++, and may further include conventional procedural programming languages such as the "C" language or a similar programming language. The program code may be fully executed on the electronic device 200, partially executed on the electronic device 200, executed as an independent software package, partially executed on the electronic device 200 and partially executed on a remote computing device, or fully executed on a remote computing device.

Specific exemplary embodiments in this disclosure are described above. Other embodiments also fall within the scope of the appended claims. In some cases, actions or steps described in the claims may be performed in a sequence different from those of these exemplary embodiments, and the expected results may still be achieved. In addition, illustration of specific sequences or continuous sequences is not necessarily required for the processes described in the drawings to achieve the expected results. In some exemplary embodiments, multi-task processing and parallel processing are also allowed or may be advantageous.

In summary, after reading details of the present disclosure, a person skilled in the art would understand that the details in the present disclosure are exemplary, not restrictive. A person skilled in the art would understand that this disclosure covers various reasonable changes, improvements, and modifications to the embodiments, although this is not specified herein. These changes, improvements, and modifications are intended to be proposed in this disclosure and are within the scope of this disclosure.

In addition, some terms in this disclosure are used to describe some exemplary embodiments of this disclosure. For example, "one embodiment", "an embodiment", and/or "some exemplary embodiments" mean/means that a specific feature, structure, or characteristic described with reference to the embodiment(s) may be included in at least one embodiment of this disclosure. Therefore, it may be emphasized and should be understood that two or more references to "an embodiment" or "one embodiment" or "alternative embodiment" in various parts of this disclosure do not necessarily all refer to the same embodiment. In addition, specific features, structures, or characteristics may be appropriately combined in one or more embodiments of this disclosure.

It should be understood that in the foregoing description of the embodiments of this disclosure, to help understand one feature, for the purpose of simplifying this disclosure, various features in this disclosure may be combined in a single embodiment, single drawing, or description thereof. However, this does not mean that the combination of these features is necessary. It is possible for a person skilled in the art to extract some of the features as a separate embodiment for understanding when reading this disclosure. In other words, an embodiment in this disclosure may also be understood as an integration of a plurality of sub-embodiments. It is also true when content of each sub-embodiment is less than all features of a single embodiment disclosed above.

Each patent, patent application, patent application publication, and other materials cited herein, such as articles, books, instructions, publications, documents, and other materials may be incorporated herein by reference. All content used for all purposes, except any prosecution document history related to the content, any identical prosecution document history that may be inconsistent or conflict with this document, or any identical prosecution document history that may have restrictive impact on the broadest scope of the claims, is associated with this document now or later. For example, if there is any inconsistency or conflict between descriptions, definitions, and/or use of terms associated with any material contained therein and descriptions, definitions, and/or use of terms related to this document, the terms in this document shall prevail.

Finally, it should be understood that the implementation solutions of this disclosure disclosed in this disclosure are descriptions of principles of the implementation solutions of this disclosure. Other modified embodiments also fall within the scope of this disclosure. Therefore, the embodiments disclosed in this disclosure are merely exemplary and not restrictive. A person skilled in the art may use alternative configurations according to the embodiments of this disclosure to implement the application in this disclosure. Therefore, the embodiments of this disclosure are not limited to those precisely described in this disclosure.

What is claimed is:

1. An audio signal processing system for echo suppression, comprising:
   at least one non-transitory storage medium storing a set of instructions for audio signal processing for echo suppression; and
   at least one processor in communication with the at least one storage medium, wherein during operation, the at least one processor executes the set of instructions to:
      select, based on a speaker input signal, a target audio processing mode of an electronic device from a plurality of audio processing modes, wherein the speaker input signal includes an audio signal sent by a control device to the electronic device;
      generate a target audio signal by processing a microphone signal in the target audio processing mode to reduce an echo in the target audio signal, wherein the microphone signal is an output signal of a microphone module obtained by the electronic device, and the microphone module includes at least one first-type microphone and at least one second-type microphone; and
      output the target audio signal, wherein
      to select the target audio processing mode of the electronic device from the plurality of audio processing modes based on the speaker input signal, the at least one processor executes the set of instructions to:
         generate, based on strength of the speaker input signal, a control signal corresponding to the speaker input signal, wherein the control signal includes a first control signal or a second control signal, including:
            generating the control signal based on the strength of the speaker input signal and the microphone signal, including:
            generating the control signal based on the strength of the speaker input signal and the evaluation parameter, including:
               determining that the strength of the speaker input signal is higher than a preset speaker threshold, and generating the second control signal, determining that the strength of the speaker input signal is lower than the speaker threshold and that the ambient noise evaluation parameter is beyond a preset noise evaluation range, and generating the first control signal, or determining that the strength of the speaker input signal is lower than the speaker threshold and that the ambient noise evaluation parameter is within the noise evaluation range, and generating the first control signal or the second control signal.

2. The audio signal processing system according to claim 1, wherein
   the at least one first-type microphone outputs a first audio signal;
   the at least one second-type microphone outputs a second audio signal; and
   the microphone signal includes the first audio signal and the second audio signal.

3. The audio signal processing system according to claim 2, wherein
   the at least one first-type microphone is configured to capture a human body vibration signal; and
   the at least one second-type microphone is configured to capture an air vibration signal.

4. The audio signal processing system according to claim 2, wherein the plurality of audio processing modes includes:
   a first mode, for performing signal processing on the first audio signal and the second audio signal; and
   a second mode, for performing signal processing on the second audio signal.

5. The audio signal processing system according to claim 4, wherein to select the target audio processing mode of the electronic device from the plurality of audio processing modes based on the speaker signal, the at least one processor further executes the set of instructions to:
   select the target audio processing mode corresponding to the control signal, wherein the first mode corresponds to the first control signal, and the second mode corresponds to the second control signal.

6. The audio signal processing system according to claim 5, wherein to generate the control signal corresponding to the speaker input signal, the at least one processor executes the set of instructions to:
   determine that the strength of the speaker input signal is lower than a preset speaker threshold, and generating the first control signal; or
   determine that the strength of the speaker input signal is higher than the preset speaker threshold, and generating the second control signal.

7. The audio signal processing system according to claim 5, wherein to generate the target audio, the at least one processor executes the set of instructions to:
   generate a first target audio by performing signal processing on the first audio signal and the second audio signal according to a first algorithm in the first mode; or
   generate a second target audio by performing signal processing on the second audio signal according to a second algorithm in the second mode, wherein
   the target audio includes the first target audio or the second target audio.

8. The audio signal processing system according to claim 7, wherein to output the target audio, the at least one processor executes the set of instructions to:
perform smoothing processing on the target audio;
determine that the target audio switches between the first target audio and the second target audio, and then performing smoothing processing on a joint between the first target audio and the second target audio; and
output the target audio after the smoothing processing.

9. The audio signal processing system according to claim 5, wherein the at least one processor further executes the set of instructions to:
control strength of a speaker input signal of a speaker based on the control signal.

10. The audio signal processing system according to claim 9, wherein to control the strength of the speaker input signal of the speaker based on the control signal, the at least one processor executes the set of instructions to:
determine that the control signal is the first control signal, and reducing the strength of the speaker input signal of the speaker, thereby reducing strength of sound output by the speaker.

11. The audio signal processing system according to claim 1,
the evaluation parameter includes an ambient noise evaluation parameter, and the ambient noise evaluation parameter includes at least one of an ambient noise level or a signal-to-noise ratio.

12. The audio signal processing system according to claim 1, wherein that the ambient noise evaluation parameter is within the noise evaluation range includes at least one of the following:
the ambient noise level is lower than a preset ambient noise threshold; or
the signal-to-noise ratio is higher than a preset signal-to-noise ratio threshold.

13. The audio signal processing system according to claim 1, wherein
the evaluation parameter further includes human voice signal strength; and
to generate the control signal based on the strength of the speaker input signal and the evaluation parameter, the at least one processor executes the set of instructions to:
determine that the strength of the speaker input signal is higher than a preset speaker threshold, that the human voice signal strength exceeds a preset human voice threshold, and that the ambient noise evaluation parameter is beyond a preset noise evaluation range, and generating the first control signal;
determine that the strength of the speaker input signal is higher than the speaker threshold, that the human voice signal strength exceeds the human voice threshold, and that the ambient noise evaluation parameter is within the noise evaluation range, and generating the second control signal;
determine that the strength of the speaker input signal is higher than the speaker threshold and that the human voice signal strength is lower than the human voice threshold, and generating the second control signal;
determine that the strength of the speaker input signal is lower than the speaker threshold and that the ambient noise evaluation parameter is beyond the noise evaluation range, and generating the first control signal; or
determine that the strength of the speaker input signal is lower than the speaker threshold and that the ambient noise evaluation parameter is within the noise evaluation range, and generating the first control signal or the second control signal.

14. The audio signal processing system according to claim 13, wherein that the ambient noise evaluation parameter is within the noise evaluation range includes at least one of the following:
the ambient noise level is lower than a preset ambient noise threshold; or
the signal-to-noise ratio is higher than a preset signal-to-noise ratio threshold.

15. An audio signal processing method for echo suppression, comprising:
selecting, based on a speaker input signal, a target audio processing mode of an electronic device from a plurality of audio processing modes, wherein the speaker input signal includes an audio signal sent by a control device to the electronic device;
generating a target audio signal by processing a microphone signal in the target audio processing mode to reduce an echo in the target audio signal, wherein the microphone signal is an output signal of a microphone module obtained by the electronic device, and the microphone module includes at least one first-type microphone and at least one second-type microphone; and
outputting the target audio signal, wherein
the selecting of the target audio processing mode of the electronic device from the plurality of audio processing modes based on the speaker input signal includes:
generating, based on strength of the speaker input signal, a control signal corresponding to the speaker input signal, wherein the control signal includes a first control signal or a second control signal, including:
generating the control signal based on the strength of the speaker input signal and the microphone signal, including:
generating the control signal based on the strength of the speaker input signal and the evaluation parameter, including:
determining that the strength of the speaker input signal is higher than a preset speaker threshold, and generating the second control signal, determining that the strength of the speaker input signal is lower than the speaker threshold and that the ambient noise evaluation parameter is beyond a preset noise evaluation range, and generating the first control signal, or determining that the strength of the speaker input signal is lower than the speaker threshold and that the ambient noise evaluation parameter is within the noise evaluation range, and generating the first control signal or the second control signal.

16. The audio signal processing method according to claim 15, wherein
the at least one first-type microphone is configured to capture a human body vibration signal and outputs a first audio signal;
the at least one second-type microphone is configured to capture an air vibration signal and outputs a second audio signal; and
the microphone signal includes the first audio signal and the second audio signal.

17. The audio signal processing method according to claim 16, wherein the plurality of audio processing modes includes:
- a first mode, for performing signal processing on the first audio signal and the second audio signal; and
- a second mode, for performing signal processing on the second audio signal.

18. The audio signal processing method according to claim 17, wherein the selecting of the target audio processing mode of the electronic device from the plurality of audio processing modes based on the speaker input signal includes:
- generating, based on strength of the speaker input signal, a control signal corresponding to the speaker input signal, wherein the control signal includes a first control signal or a second control signal; and
- selecting a target audio processing mode corresponding to the control signal, wherein the first mode corresponds to the first control signal, and the second mode corresponds to the second control signal.

* * * * *